(12) United States Patent
Iwamoto et al.

(10) Patent No.: US 10,297,800 B2
(45) Date of Patent: May 21, 2019

(54) BATTERY HOUSING AND POWER STORAGE DEVICE HAVING A NON-METALLIC TERMINAL

(71) Applicant: Panasonic Intellectual Property Management Co., Ltd., Osaka (JP)

(72) Inventors: Kazuya Iwamoto, Osaka (JP); Mikinari Shimada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 93 days.

(21) Appl. No.: 15/195,581

(22) Filed: Jun. 28, 2016

(65) Prior Publication Data
US 2017/0018754 A1 Jan. 19, 2017

(30) Foreign Application Priority Data

Jul. 15, 2015 (JP) ................................ 2015-140987

(51) Int. Cl.
*H02J 7/00* (2006.01)
*H01M 2/06* (2006.01)
*H01M 2/30* (2006.01)
*H01M 2/32* (2006.01)

(52) U.S. Cl.
CPC .............. *H01M 2/06* (2013.01); *H01M 2/30* (2013.01); *H01M 2/32* (2013.01)

(58) Field of Classification Search
CPC ............ H01M 2/06; H01M 2/30; H01M 2/32; H01M 2/302; H02J 7/0045
USPC ....................................................... 320/107
See application file for complete search history.

(56) References Cited

U.S. PATENT DOCUMENTS

| 7,070,441 | B1 * | 7/2006 | Gregory | H01M 2/0237 429/182 |
| 2007/0059592 | A1 * | 3/2007 | Takami | H01M 2/0257 429/161 |
| 2014/0191763 | A1 * | 7/2014 | Hu | H01M 10/4285 324/426 |
| 2014/0255768 | A1 * | 9/2014 | Jang | B23K 20/106 429/179 |
| 2014/0302381 | A1 * | 10/2014 | Song | H01M 2/024 429/158 |
| 2015/0115896 | A1 * | 4/2015 | Shimomura | H01M 4/364 320/136 |

(Continued)

FOREIGN PATENT DOCUMENTS

JP 2013-004179 1/2013

*Primary Examiner* — Nathaniel R Pelton
(74) *Attorney, Agent, or Firm* — McDermott Will & Emery LLP

(57) ABSTRACT

A battery housing includes: an exterior member; and a first terminal of a non-metallic material, wherein the first terminal has a first end extending to outside of the exterior member, the first terminal has a second end extending to inside of the exterior member, the first terminal includes a first long-diameter part having a first long diameter and a second long-diameter part having a second long diameter larger than the first long diameter, the first long-diameter part and the second long-diameter part being disposed between the first end of the first terminal and the second end of the first terminal, and the first long-diameter part and the second long-diameter part are embedded in the exterior member.

28 Claims, 25 Drawing Sheets

(56) References Cited

U.S. PATENT DOCUMENTS

2015/0214536 A1* 7/2015 Lee .................... H01M 2/021
              429/179
2015/0236330 A1* 8/2015 Takami ................ H01M 2/32
              429/158

\* cited by examiner

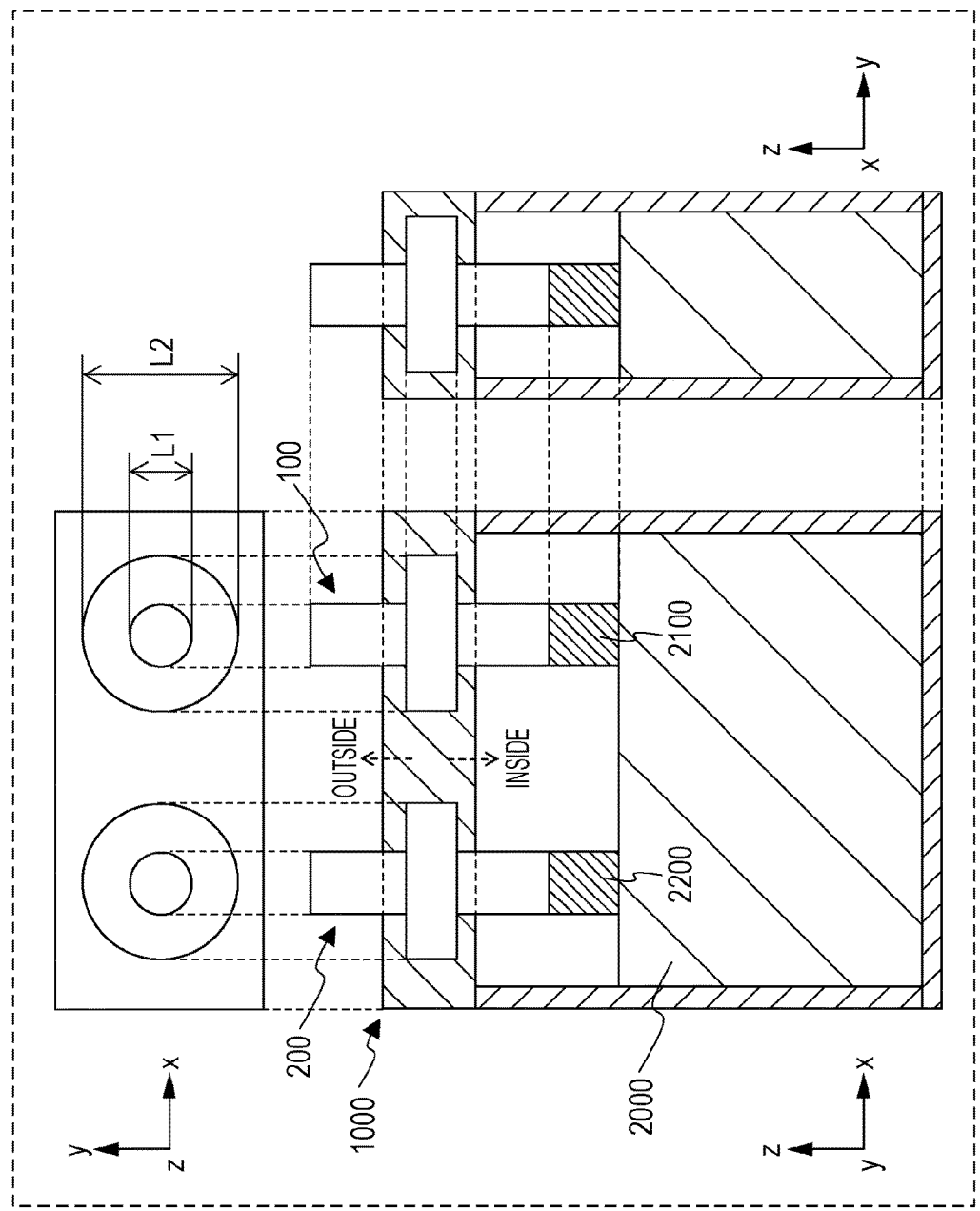

BATTERY HOUSING AND POWER STORAGE DEVICE HAVING A NON-METALLIC TERMINAL

BACKGROUND

1. Technical Field

The present disclosure relates to a housing (e.g., battery housing) usable for a power storage device or other devices.

2. Description of the Related Art

Japanese Unexamined Patent Application Publication No. 2013-4179 discloses a secondary battery including a terminal portion of carbon fiber fabric and entirely enclosed with a film.

SUMMARY

In a typical technique, it is desired to more firmly suppress entering of water or other substances into the inside of an exterior member of a housing.

In one general aspect, the techniques disclosed here feature a battery housing including: an exterior member; and a first terminal of a non-metallic material, wherein the first terminal has a first end extending to outside of the exterior member, the first terminal has a second end extending to inside of the exterior member, the first terminal includes a first long-diameter part having a first long diameter and a second long-diameter part having a second long diameter larger than the first long diameter, the first long-diameter part and the second long-diameter part being disposed between the first end of the first terminal and the second end of the first terminal, and the first long-diameter part and the second long-diameter part are embedded in the exterior member.

One non-limiting and exemplary embodiment provides a housing that can more firmly suppress entering of water or other substances into the inside of an exterior member of a housing.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 25 schematically illustrates a configuration of a power storage device according to an eleventh embodiment.

DETAILED DESCRIPTION

Embodiments of the present disclosure will be described hereinafter with reference to the drawings.

First Embodiment

Figure 1:
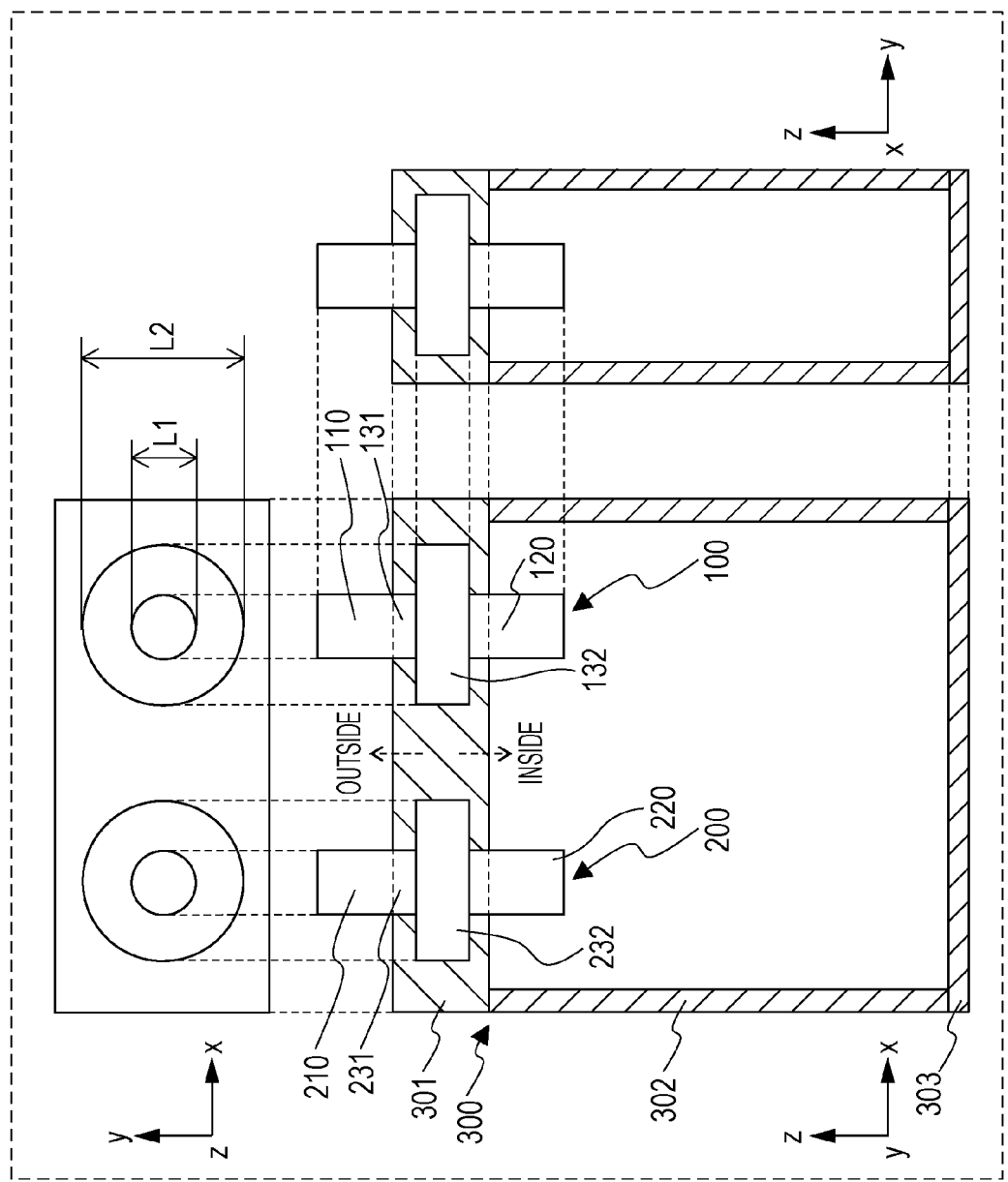
FIG. 1 schematically illustrates a configuration of a housing according to a first embodiment.

FIG. 1 schematically illustrates a configuration of a housing according to a first embodiment.

FIG. 1 illustrates an x-z view (front view), a y-z view (side view), and an x-y view (top view), as perspective views.

The housing (e.g., battery housing) according to the first embodiment includes an exterior member 300 and a terminal 100 (first terminal).

The terminal 100 is made of a non-metallic material.

A first end 110 of the terminal 100 extends (e.g., is exposed) to the outside of the exterior member 300.

A second end 120 of the terminal 100 extends (e.g., is exposed) to the inside of the exterior member 300.

The terminal 100 includes a first long-diameter part 131 and a second long-diameter part 132, between the first end 110 of the terminal 100 and the second end 120 of the terminal 100.

The first long-diameter part 131 has a first long diameter L1.

The second long-diameter part 132 has a second long diameter L2. The second long diameter L2 is larger than the first long diameter L1.

The first long-diameter part 131 and the second long-diameter part 132 are embedded in the exterior member 300.

First, in the configuration described above, the terminal is made of a non-metallic material, and thus, corrosion of the terminal can be suppressed. For example, in the case of a battery housing containing a battery and the like, if a liquid junction of water (e.g., rain water or sea water) occurs between a positive electrode and a negative electrode because of submersion (due to heavy rain, flood, or water leakage, etc.), corrosion occurs in a typical metallic terminal. On the other hand, in a terminal of a non-metallic material as described in the first embodiment, even if the liquid junction occurs, corrosion of the terminal can be suppressed. Accordingly, formation of a gap due to corrosion of the terminal can be suppressed. As a result, entering of water or other substances into the exterior member of the housing can be more firmly suppressed.

Next, in the configuration described above, since the terminal 100 includes the second long-diameter part 132, a creepage distance (i.e., a length of a path along a contour of the terminal) is increased. That is, a length of a path through which water or other substances enter can be increased. As a result, entering of water or other substances into the exterior member of the housing can be more firmly suppressed.

As described above, since the entering of water or other substances into the exterior member of the housing can be suppressed, degradation of performance of a power-generation element (e.g., a battery cell) housed in the exterior member of the housing can be suppressed. Even in a case where the power-generation element contains a metal having a potential lower than a hydrogen generation potential (e.g., lithium, sodium, or magnesium), for example, generation of hydrogen caused by entering of water can be suppressed. As a result, an increase in internal pressure and degradation of battery performance caused by hydrogen generation can be suppressed.

The exterior member 300 is, for example, an exterior component disposed around the power-generation element housed in the housing according to the first embodiment.

In the example illustrated in FIG. 1, the exterior member 300 includes a lid 301, a side wall 302, and a bottom 303.

In the example illustrated in FIG. 1, the terminal 100 is embedded in the lid 301.

In the first embodiment, the terminal 100 may be embedded in the side wall 302 or the bottom 303.

In the first embodiment, the exterior member 300 may not include at least one of the lid 301, the side wall 302, or the bottom 303. For example, the exterior member 300 may be combined with another exterior component so that the combined exterior members surround the power-generation element housed in the housing. With this configuration, space in which the power-generation element is housed may be hermetically sealed.

Alternatively, the exterior member 300 may be an exterior component having a high deformability, such as a film material. In this case, the exterior member 300 may surround the power-generation element housed in the housing. In this configuration, space in which the power-generation element is housed may be hermetically sealed.

As a material constituting the exterior member 300, a generally known material (e.g., a metal material or a resin material) can be used.

The "outside" of the exterior member 300 to which the first end 110 of the terminal 100 extends is a portion in which the power-generation element is not housed, for example.

The "inside" of the exterior member 300 to which the second end 120 of the terminal 100 extends is a portion in which the power-generation element is housed, for example.

The terminal 100 is, for example, a terminal connected to an electrode of the power-generation element housed in the housing according to the first embodiment.

A non-metallic material constituting the terminal 100 is a material that does not electrochemically corrode and has electron conductivity.

Examples of the non-metallic material include a carbon material, electrically conductive glass, and an electrically conductive polymeric material.

Examples of the carbon material include graphite, carbon black (e.g., acetylene black and Ketjen black), and glassy carbon.

Examples of the electrically conductive glass include electrically conductive glass of, for example, vanadium oxide, indium oxide, or tin oxide.

Examples of the electrically conductive polymeric material include polyacethylene, polythiophene, and polypyrrole.

Non-metallic materials constituting the first end 110, the second end 120, the first long-diameter part 131, and the second long-diameter part 132 in the terminal 100 may be the same material or at least partially different from one another.

In the case where the first end 110, the second end 120, the first long-diameter part 131, and the second long-diameter part 132 in the terminal 100 are made of the same material, an electric resistance of the terminal 100 can be further reduced.

In the example illustrated in FIG. 1, a portion of the terminal 100 embedded in the exterior member 300 has a flange shape.

Thus, in this embedded portion, the path length of the contour of the terminal is longer than the minimum distance between the first end 110 and the second end 120.

In the example illustrated in FIG. 1, the first long-diameter part 131 is also disposed between the second end 120 and the second long-diameter part 132 of the terminal 100.

In the first embodiment, the second end 120 and the second long-diameter part 132 of the terminal 100 may be in contact with each other.

The first embodiment may employ a configuration in which the first long-diameter part 131 is disposed between the second end 120 and the second long-diameter part 132 of the terminal 100 and the first end 110 and the second long-diameter part 132 of the terminal 100 may be in contact with each other.

In the example illustrated in FIG. 1, the first end 110, the second end 120, the first long-diameter part 131, and the second long-diameter part 132 in the terminal 100 have circular cross-sectional shapes.

Figure 2:
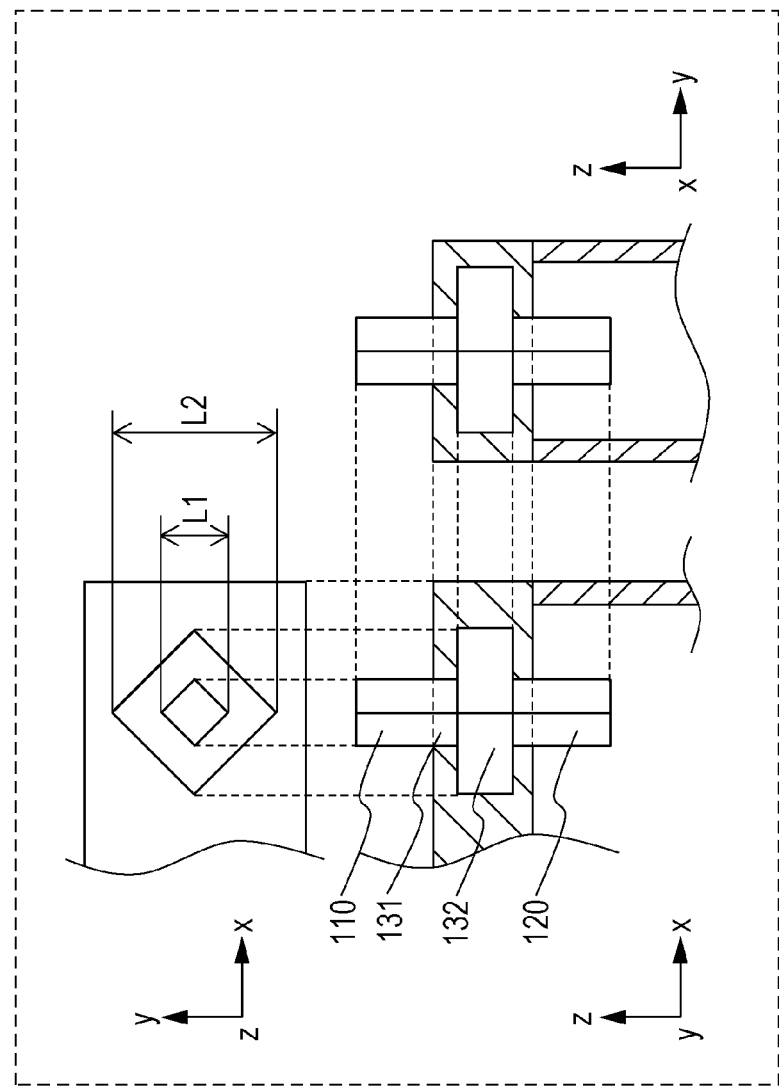
FIG. 2 schematically illustrates a configuration of a housing according to a variation of the first embodiment.

FIG. 2 schematically illustrates a configuration of a housing according to a variation of the first embodiment.

FIG. 2 illustrates, as perspective views, an x-z view (front view), a y-z view (side view), and an x-y view (top view) of the terminal of the housing and a peripheral portion of the terminal in FIG. 1.

As illustrated in FIG. 2, the first end 110, the second end 120, the first long-diameter part 131, and the second long-diameter part 132 in the terminal 100 may have square cross-sectional shapes.

In the example illustrated in FIG. 2, the first long diameter L1 is a length of a longest line among lines connecting vertexes of a square formed by the first long-diameter part 131.

In the example illustrated in FIG. 2, the second long diameter L2 is a length of a longest line among lines connecting vertexes of a square formed by the second long-diameter part 132.

The first end 110, the second end 120, the first long-diameter part 131, and the second long-diameter part 132 in the terminal 100 may have other cross-sectional shapes (e.g., oval cross-sectional shapes).

The first end 110, the second end 120, the first long-diameter part 131, and the second long-diameter part 132 in the terminal 100 may have the same cross-sectional shape or at least partially different cross-sectional shapes.

An example method for fabricating a housing according to the first embodiment will now be described.

First, a terminal 100 is formed. Next, an exterior member 300 is formed to cover a first long-diameter part 131 and a second long-diameter part 132. In this manner, the terminal 100 is embedded in the exterior member 300.

The housing according to the first embodiment may include two or more terminals.

Specifically, as illustrated in FIG. 1, the housing according to the first embodiment may include a second terminal 200 of a non-metallic material.

A first end 210 of the second terminal 200 extends (e.g., is exposed) to the outside of the exterior member 300.

A second end 220 of the second terminal 200 extends (e.g., is exposed) to the inside of the exterior member 300.

The second terminal 200 includes a first long-diameter part 231 and a second long-diameter part 232, between the first end 210 of the second terminal 200 and the second end 220 of the second terminal 200.

The first long-diameter part 231 of the second terminal 200 has a first long diameter L1.

The second long-diameter part 232 of the second terminal 200 has a second long diameter L2. The second long diameter L2 is larger than the first long diameter L1.

The first long-diameter part 231 of the second terminal 200 and the second long-diameter part 232 of the second terminal 200 are embedded in the exterior member 300.

In the configuration described above, both of the two terminals have high resistance to corrosion and to entering of water and other substances. In this manner, degradation of performance of the power-generation element (e.g., a battery cell) housed in the exterior member of the housing can be more firmly suppressed.

The second terminal 200 is, for example, a terminal connected to an electrode of the power-generation element housed in the housing according to the first embodiment.

In a case where the power-generation element housed in the housing according to the first embodiment includes a positive electrode and a negative electrode, the terminal 100 may be connected to one of the positive electrode or the negative electrode with the second terminal 200 being connected to the other.

Configurations (including a material, a shape, a fabrication method, an installation method, etc.) of the second terminal 200 can be similar to configurations of the terminal 100 described above.

The terminal 100 and the second terminal 200 may have the same configuration or at least partially different configurations.

As illustrated in FIG. 1, portions of the terminal 100 and the second terminal 200 may be embedded in the lid 301 of the exterior member 300.

Alternatively, the terminal 100 and the second terminal 200 may be embedded in the side wall 302 or the bottom 303.

Alternatively, the terminal 100 and the second terminal 200 may be embedded in different parts of the exterior member 300.

Second Embodiment

A second embodiment will now be described. Part of the second embodiment already described in the first embodiment is not described when unnecessary.

Figure 3:
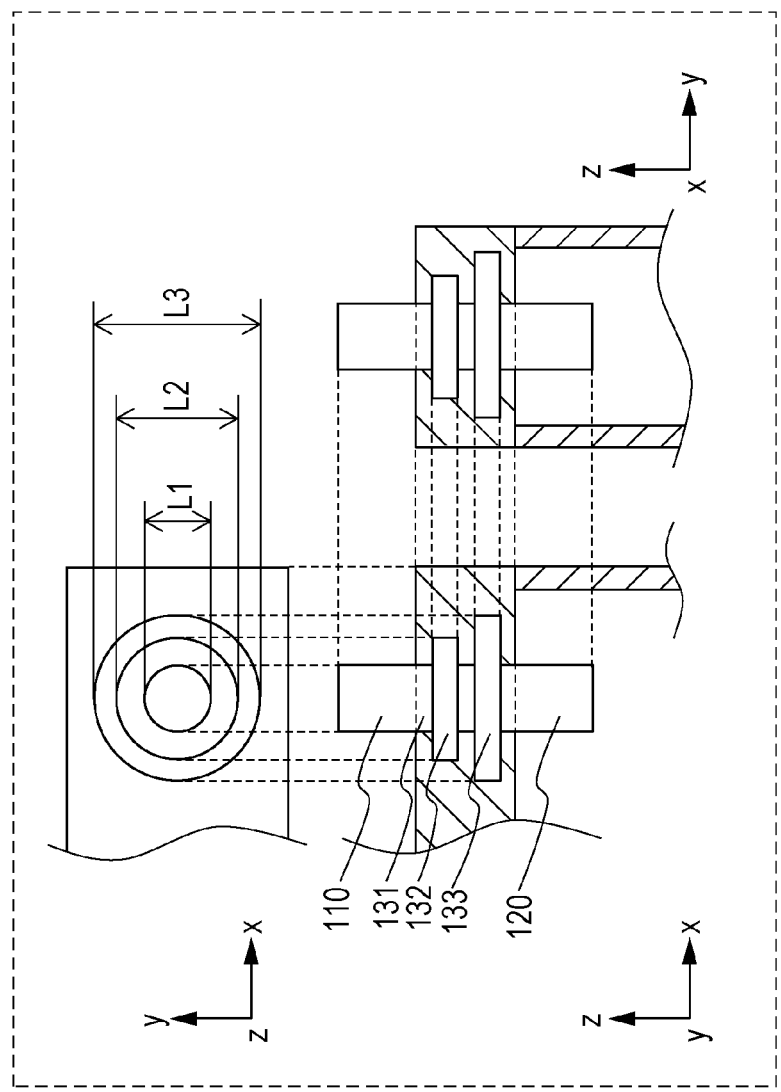
FIG. 3 schematically illustrates a configuration of a housing according to a second embodiment.

FIG. 3 schematically illustrates a configuration of a housing according to the second embodiment.

In addition to the configuration described in the first embodiment, the housing according to the second embodiment includes the following configuration.

Specifically, a terminal 100 of a housing according to the second embodiment includes a third long-diameter part 133 between a first end 110 of the terminal 100 and a second end 120 of the terminal 100.

The third long-diameter part 133 has a third long diameter L3. The third long diameter L3 is larger than the first long diameter L1.

The third long-diameter part 133 is embedded in the exterior member 300.

In the configuration described above, since the terminal 100 includes the third long-diameter part 133, a creepage distance (i.e., a length of a path along a contour of the terminal) is increased. That is, the length of a path through which water or other substances enters can be increased. As a result, entering of water or other substances into the exterior member of the housing can be more firmly suppressed.

In the example illustrated in FIG. 3, the third long diameter L3 is larger than a second long diameter L2.

In the second embodiment, the third long diameter L3 may be smaller than the second long diameter L2.

Alternatively, in the second embodiment, the third long diameter L3 may be equal to the second long diameter L2.

In the example illustrated in FIG. 3, the first long-diameter part 131 is also disposed between a second long-diameter part 132 and the third long-diameter part 133.

In the second embodiment, the second long-diameter part 132 and the third long-diameter part 133 may be in contact with each other.

In the example illustrated in FIG. 3, the first long-diameter part 131 is also disposed between the second end 120 and the third long-diameter part 133 of the terminal 100.

In the second embodiment, the second end 120 and the third long-diameter part 133 of the terminal 100 may be in contact with each other.

Figure 4:
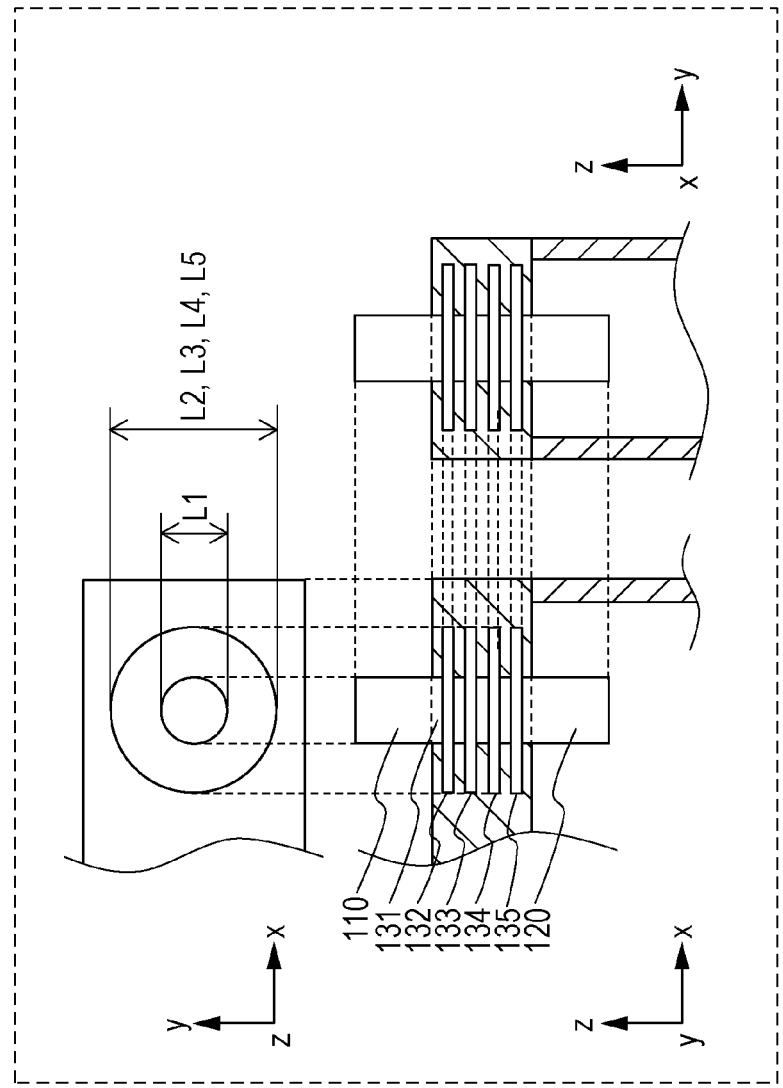
FIG. 4 schematically illustrates a configuration of a housing according to a variation of the second embodiment.

FIG. 4 schematically illustrates a configuration of a housing according to a variation of the second embodiment.

In the example illustrated in FIG. 4, the terminal 100 includes a fourth long-diameter part 134 and a fifth long-diameter part 135, between the first end 110 of the terminal 100 and the second end 120 of the terminal 100.

The fourth long-diameter part 134 has a fourth long diameter L4. The fourth long diameter L4 is larger than the first long diameter L1.

The fifth long-diameter part 135 has a fifth long diameter L5. The fifth long diameter L5 is larger than the first long diameter L1.

The fourth long-diameter part 134 and the fifth long-diameter part 135 are embedded in the exterior member 300.

In the configuration described above, since the terminal 100 includes the fourth long-diameter part 134 and the fifth long-diameter part 135, a creepage distance (i.e., a length of a path along an contour of the terminal) is increased. That is, the length of a path through which water or other substances enters can be increased. As a result, entering of water or other substances into the exterior member of the housing can be more firmly suppressed.

In the example illustrated in FIG. 4, a portion of the terminal 100 embedded in the exterior member 300 has a fin shape.

Thus, in this embedded portion, the path length of the contour of the terminal is longer than the minimum distance between the first end 110 and the second end 120.

In the example illustrated in FIG. 4, the second long diameter L2, the third long diameter L3, the fourth long diameter L4, and the fifth long diameter L5 are equal to each other.

In the second embodiment, the second long diameter L2, the third long diameter L3, the fourth long diameter L4, and the fifth long diameter L5 may be different from one another.

In the second embodiment, the terminal 100 may have five or more long-diameter parts each having a long diameter larger than that of the first long diameter L1.

Configurations (including a material, a shape, a fabrication method, an installation method, etc.) of the long-diameter part (e.g., the third long-diameter part 133, the fourth long-diameter part 134, or the fifth long-diameter part 135) having a long diameter larger than that of the first long diameter L1 may be similar to configurations of the second long-diameter part 132 described in the first embodiment can be employed.

Third Embodiment

A third embodiment will now be described. Part of the third embodiment already described in the first or second embodiments is not described when unnecessary.

Figure 5:
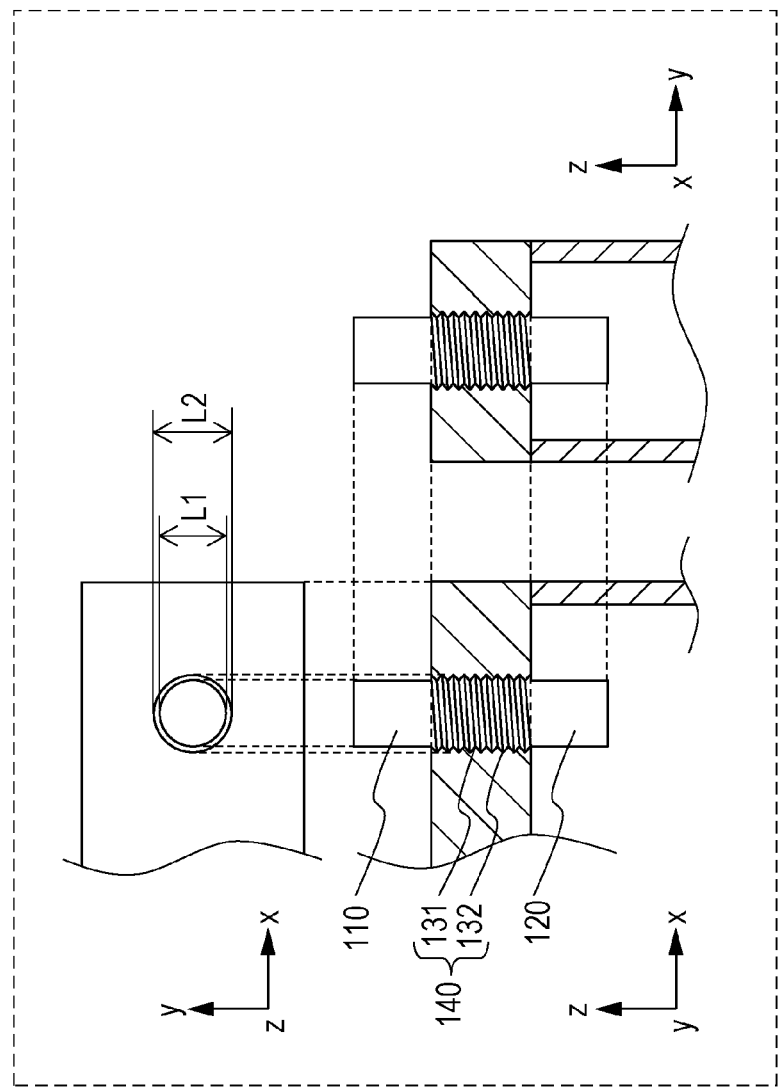
FIG. 5 schematically illustrates a configuration of a housing according to a third embodiment.

FIG. 5 schematically illustrates a configuration of a housing according to the third embodiment.

In addition to the configuration described in the first embodiment, the housing according to the third embodiment includes the following configuration.

Specifically, in the third embodiment, a screw-shaped part 140 is formed by a first long-diameter part 131 and a second long-diameter part 132.

The screw-shaped part 140 is embedded in an exterior member 300.

In the configuration described above, water and other substances enter helically along the screw-shaped part 140. Thus, the length of a path through which water or other substances enters can be increased. As a result, entering of water or other substances into the exterior member of the housing can be more firmly suppressed.

In the example illustrated in FIG. 5, a portion of a terminal 100 embedded in the exterior member 300 has a screw shape.

Thus, in this embedded portion, the path length of the contour of the terminal is longer than the minimum distance between a first end 110 and a second end 120.

Figure 6:
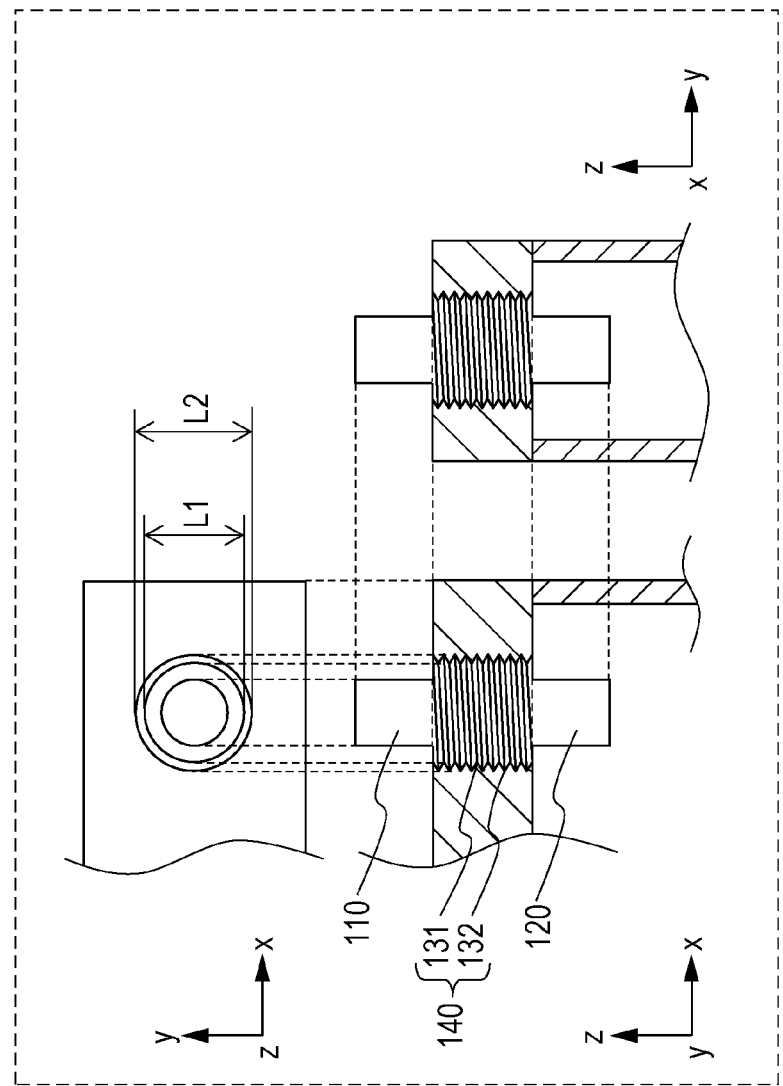
FIG. 6 schematically illustrates a configuration of a housing according to a variation of the third embodiment.

FIG. 6 schematically illustrates a configuration of a housing according to a variation of the third embodiment.

As illustrated in FIG. 6, in the third embodiment, a short diameter (L1 in FIG. 6) of the screw-shaped part 140 may be larger than at least one of the long diameter of the first end 110 of the terminal 100 and the long diameter of the second end 120 of the terminal 100.

In the configuration described above, the diameter of the screw-shaped part is larger than the diameter of the terminal so that the length of a path through which water or other substances enters can be increased. As a result, entering of water or other substances into the exterior member of the housing can be more firmly suppressed.

In the example illustrated in FIG. 6, a short diameter of the screw-shaped part 140 is larger than each of the long diameter of the first end 110 of the terminal 100 and the long diameter of the second end 120 of the terminal 100.

At least one of the long diameter of the first end 110 of the terminal 100 or the long diameter of the second end 120 of the terminal 100 may be larger than a short diameter of the screw-shaped part 140.

Fourth Embodiment

A fourth embodiment will now be described. Part of the fourth embodiment already described in one of the first through third embodiments is not described when unnecessary.

Figure 7:
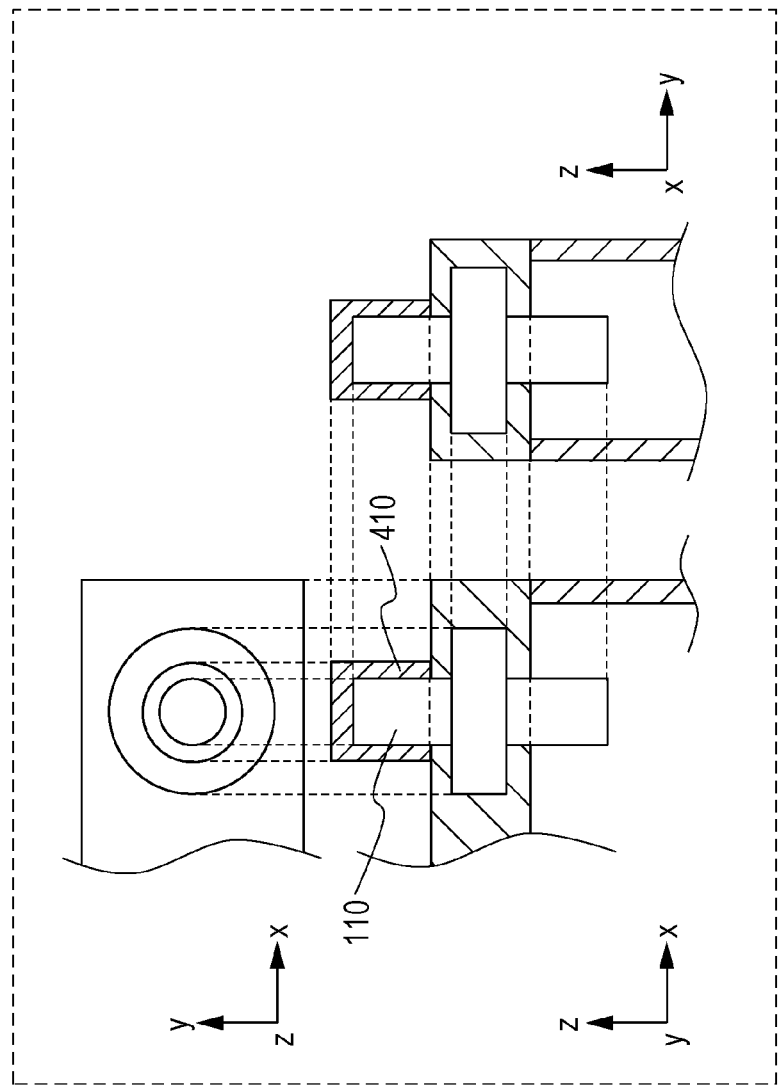
FIG. 7 schematically illustrates a configuration of a housing according to a fourth embodiment.

FIG. 7 schematically illustrates a configuration of a housing according to the fourth embodiment.

In addition to the configuration described in one of the first through third embodiments, the housing according to the fourth embodiment includes the following configuration.

Specifically, the housing according to the fourth embodiment includes a first metal part 410.

The first metal part 410 is in contact with a first end 110 of a terminal 100.

In the configuration described above, a contact resistance occurring when the first end 110 of a terminal 100 contacts a member (e.g., a wire to external equipment) connected to the terminal 100 can be reduced.

Examples of a material constituting the first metal part 410 include stainless steel, copper, nickel, lead, aluminium, and an alloy containing at least one of these metals.

Figure 8:
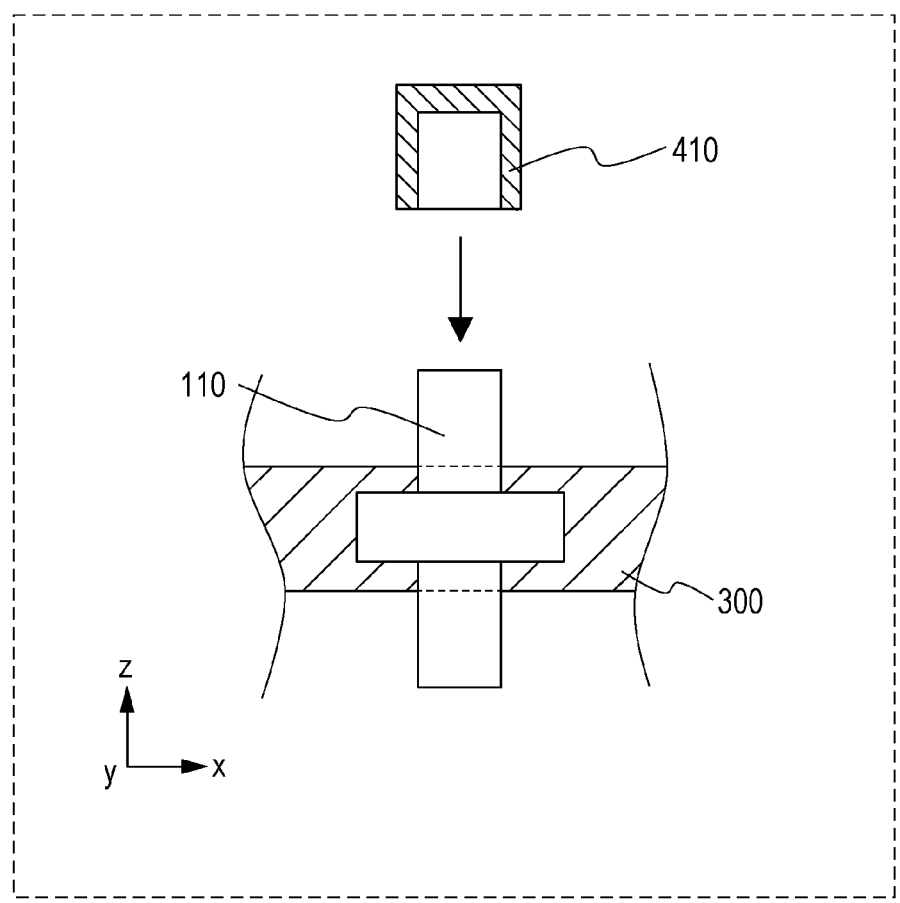
FIG. 8 schematically illustrates a method for fabricating a housing according to the fourth embodiment.

FIG. 8 schematically illustrates a method for fabricating a housing according to the fourth embodiment.

Referring to FIG. 8, an example method for fabricating a housing according to the fourth embodiment will now be described.

First, a terminal 100 and a first metal part 410 are individually prepared. At this time, the first metal part 410 is formed in a cap shape having an opening. Next, a first end 110 of the terminal 100 is inserted in the opening of the first metal part 410. In this manner, the terminal 100 and the first metal part 410 are integrated.

As a method for integrating the terminal 100 and the first metal part 410, a generally known method (e.g., a method of externally pressing for adhesion) can be employed.

The first metal part 410 may be formed, as a metal thin film, on the first end 110 of the terminal 100 by a generally known method (e.g., plating, evaporation, application of conductive paste, etc.).

The first metal part 410 is disposed not to be exposed to the inside (a part of the terminal 100 including a second end 120) of an exterior member 300.

Fifth Embodiment

A fifth embodiment will now be described. Part of the fifth embodiment already described in one of the first through fourth embodiments is not described when unnecessary.

Figure 9:
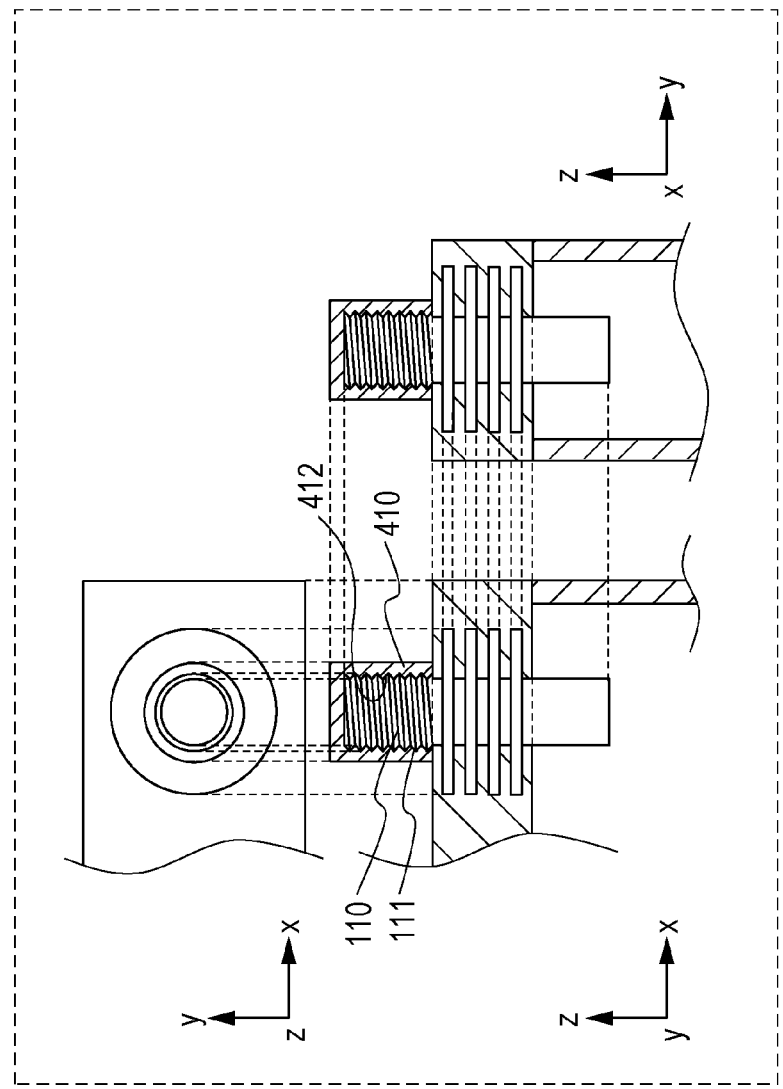
FIG. 9 schematically illustrates a configuration of a housing according to a fifth embodiment.

FIG. 9 schematically illustrates a configuration of a housing according to the fifth embodiment.

In addition to the configuration described in the fourth embodiment, the housing according to the fifth embodiment includes the following configuration.

Specifically, in the fifth embodiment, a first metal part 410 includes a screw hole 412.

A first end 110 of a terminal 100 includes a screw part 111.

The screw part 111 of the first end 110 of the terminal 100 is inserted into the screw hole 412 of the first metal part 410.

In the configuration described above, the first metal part 410 can be easily attached to the first end 110 of the terminal 100. The position of the first metal part 410 can be held with a screw structure including the first end 110 of the terminal 100. That is, the contact relationship (positional relationship) between the first metal part 410 and the first end 110 of the terminal 100 can be more strongly held.

Figure 10:
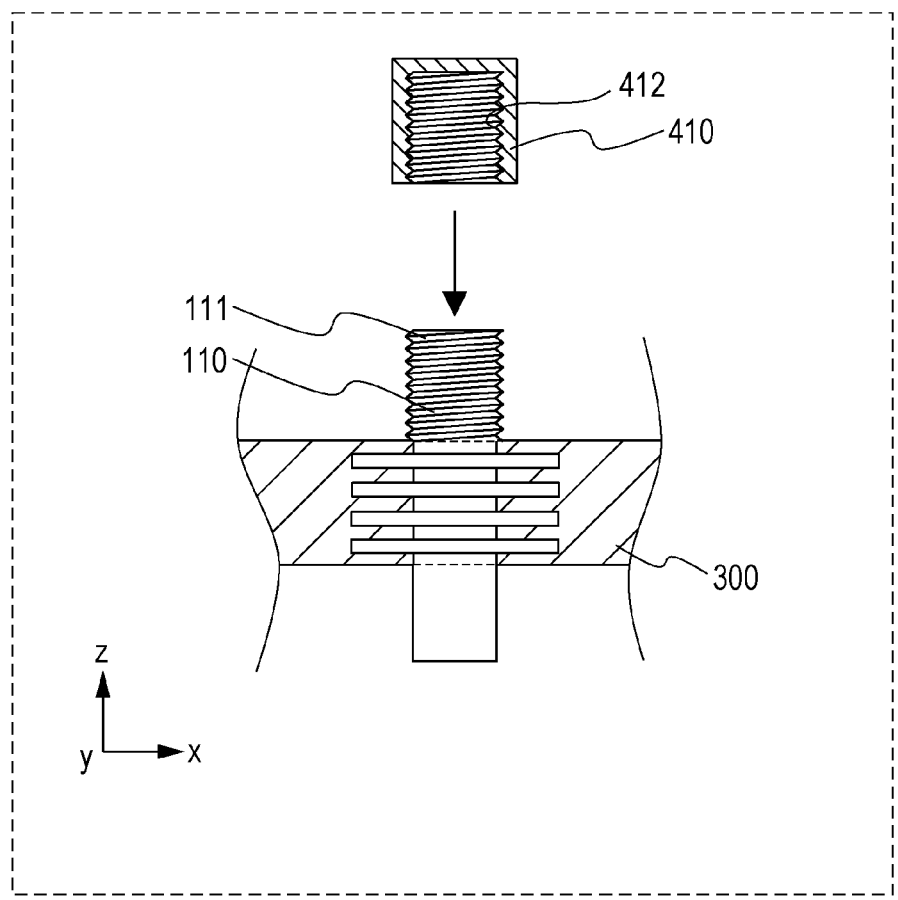
FIG. 10 schematically illustrates a method for fabricating a housing according to the fifth embodiment.

FIG. 10 schematically illustrates a method for fabricating a housing according to the fifth embodiment.

Referring to FIG. 10, an example method for fabricating a housing according to the fifth embodiment will now be described.

First, a terminal 100 and a first metal part 410 are individually prepared. At this time, a screw part 111 is formed in a first end 110 of the terminal 100. A screw hole 412 is formed in the first metal part 410. The screw part 111 of the first end 110 of the terminal 100 is then inserted into the screw hole 412 of the first metal part 410. In this manner, the terminal 100 and the first metal part 410 are integrated.

Sixth Embodiment

A sixth embodiment will now be described. Part of the sixth embodiment already described in one of the first through fifth embodiments is not described when unnecessary.

Figure 11:
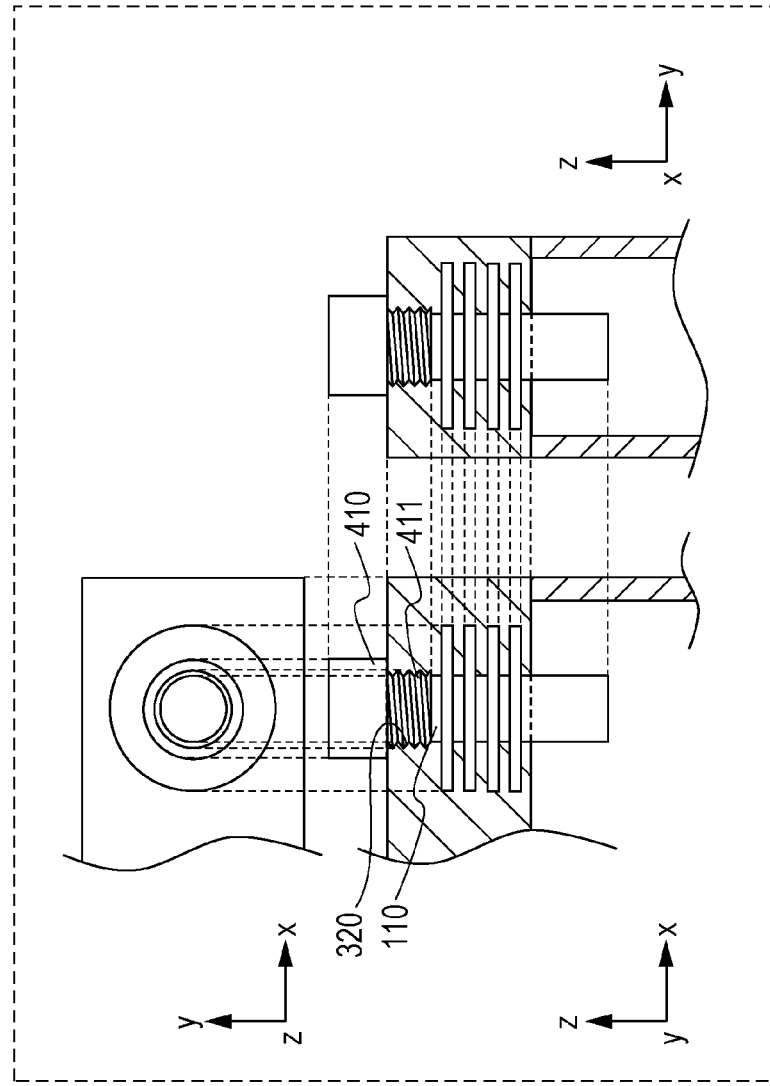
FIG. 11 schematically illustrates a configuration of a housing according to a sixth embodiment.

FIG. 11 schematically illustrates a configuration of a housing according to the sixth embodiment.

In addition to the configuration described in the fourth embodiment, the housing according to the sixth embodiment includes the following configuration.

Specifically, in the sixth embodiment, an exterior member 300 includes an outer screw hole 320 disposed outside the exterior member 300.

A first metal part 410 includes a screw part 411.

The screw part 411 of the first metal part 410 is inserted into the outer screw hole 320.

In the configuration described above, the first metal part 410 can be easily attached to the housing. The position of the first metal part 410 can be held with a screw structure including the exterior member 300. That is, the contact relationship (positional relationship) between the first metal part 410 and a first end 110 of a terminal 100 can be more strongly held by the sturdier exterior member 300.

Figure 12:
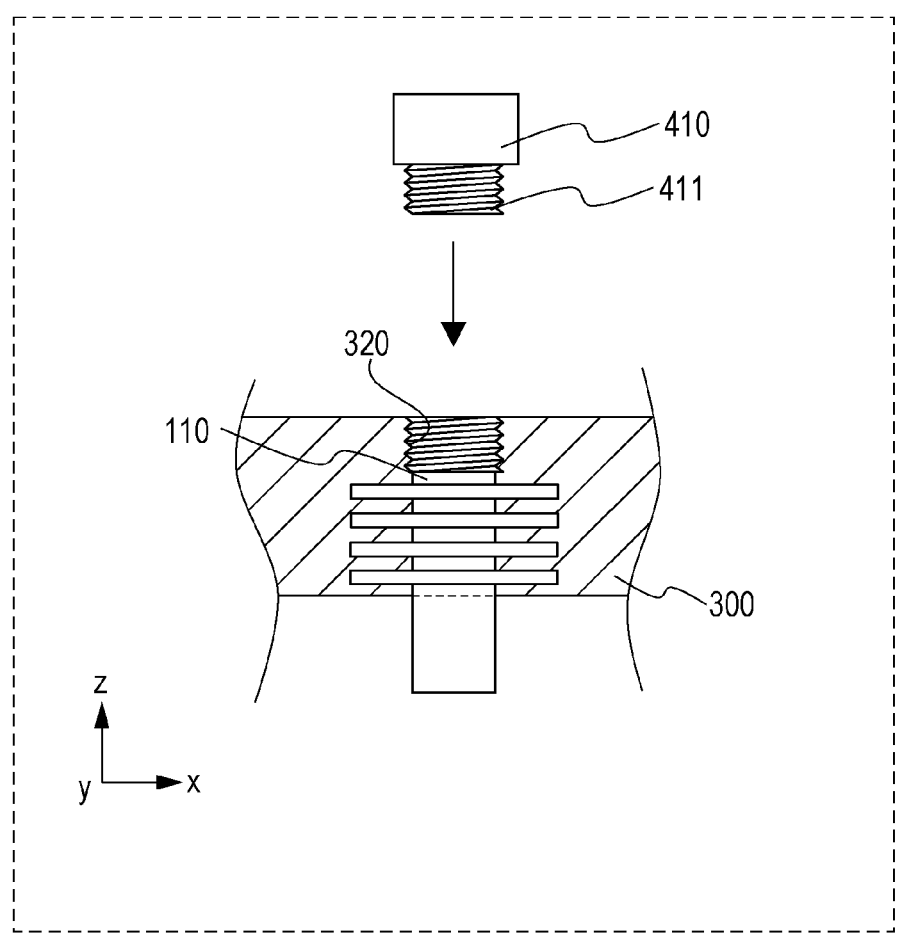
FIG. 12 schematically illustrates a method for fabricating a housing according to the sixth embodiment.

FIG. 12 schematically illustrates a method for fabricating a housing according to the sixth embodiment.

Referring to FIG. 12, an example method for fabricating a housing according to the sixth embodiment will now be described.

First, a terminal 100 and a first metal part 410 are individually prepared. At this time, a screw part 411 is formed in the first metal part 410. The terminal 100 is integrated with the exterior member 300. An outer screw hole 320 is formed in the exterior member 300. The screw part 411 of the first metal part 410 is then inserted into the outer screw hole 320 of the exterior member 300. In this manner, the terminal 100 and the first metal part 410 come into contact with each other.

Figure 13:
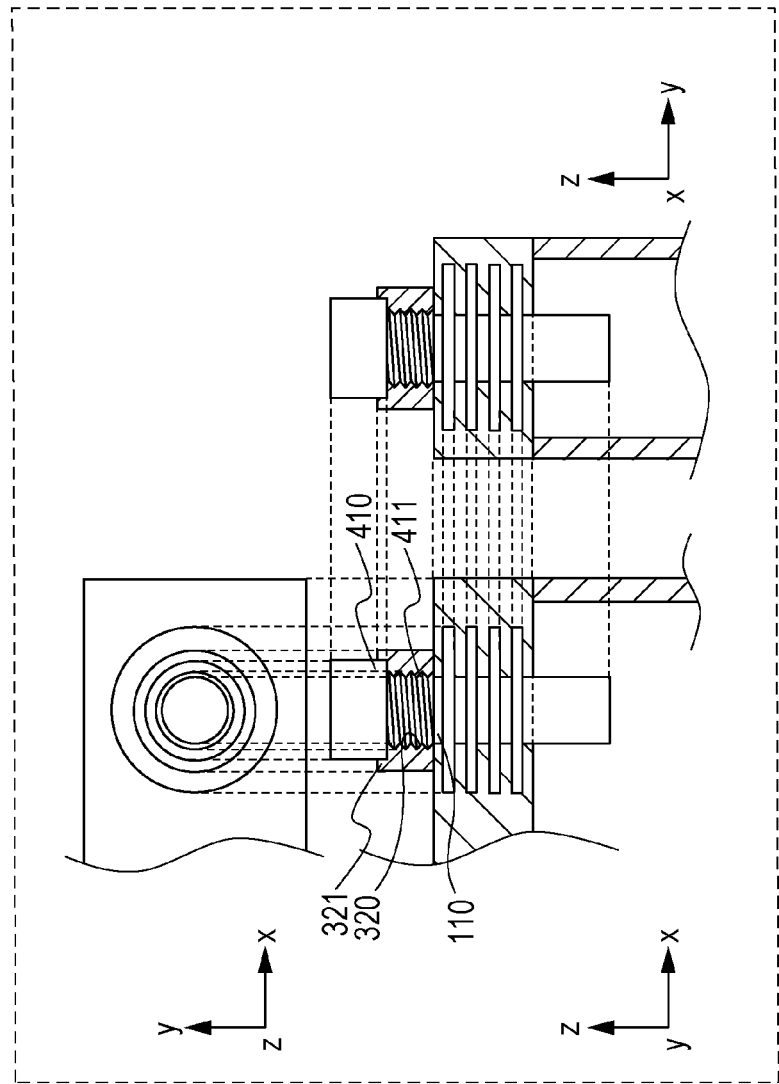
FIG. 13 schematically illustrates a configuration of a housing according to a variation of the sixth embodiment.

FIG. 13 schematically illustrates a configuration of a housing according to a variation of the sixth embodiment.

In the example illustrated in FIG. 13, the exterior member 300 includes an outer projection 321.

The outer projection 321 includes an outer screw hole 320.

In the configuration described above, even in a case where a screw hole cannot be formed in the exterior member 300 due to, for example, a small thickness of the exterior member 300, the outer projection 321 enables the outer screw hole 320 to be disposed.

Figure 14:
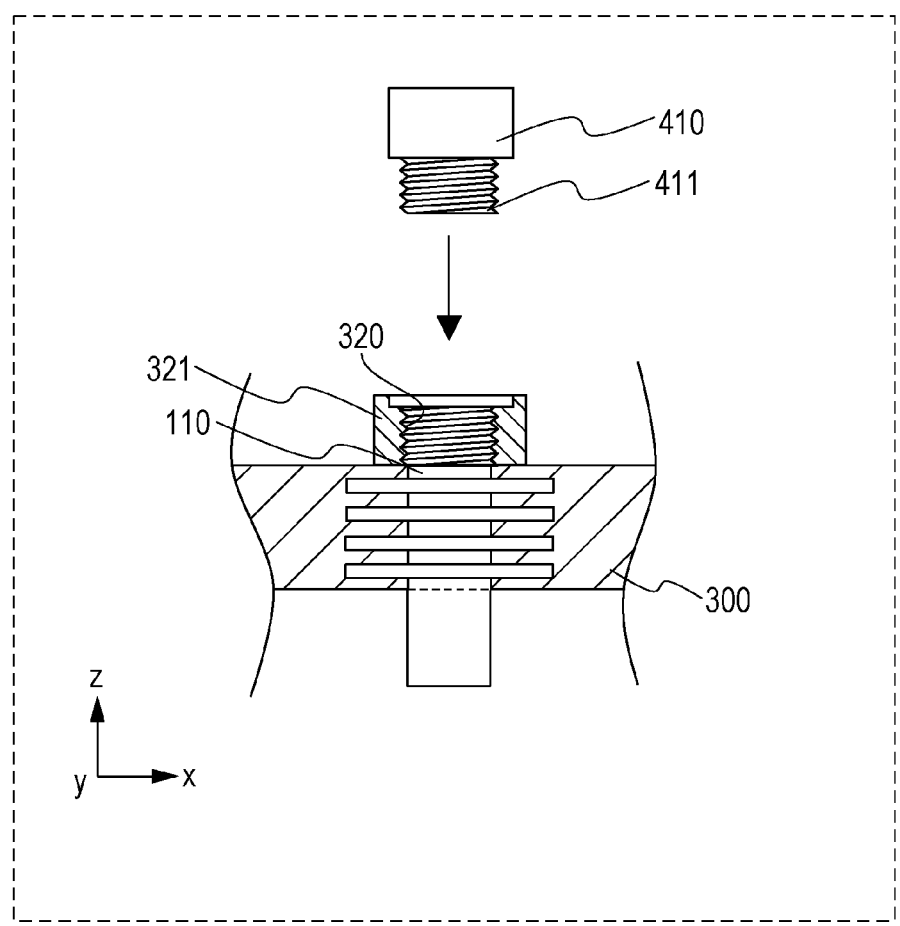
FIG. 14 schematically illustrates a method for fabricating a housing according to a variation of the sixth embodiment.

FIG. 14 schematically illustrates a method for fabricating a housing according to a variation of the sixth embodiment.

Referring to FIG. 14, an example method for fabricating a housing according to the sixth embodiment will now be described.

First, a terminal 100 and a first metal part 410 are individually prepared. At this time, a screw part 411 is formed in the first metal part 410. The terminal 100 is integrated with the exterior member 300. An outer projection 321 including an outer screw hole 320 is provided on the exterior member 300. The screw part 411 of the first metal part 410 is then inserted into the outer screw hole 320 of the outer projection 321 of the exterior member 300. In this manner, the terminal 100 and the first metal part 410 come into contact with each other.

Seventh Embodiment

A seventh embodiment will now be described. Part of the seventh embodiment already described in one of the first through sixth embodiments is not described when unnecessary.

Figure 15:
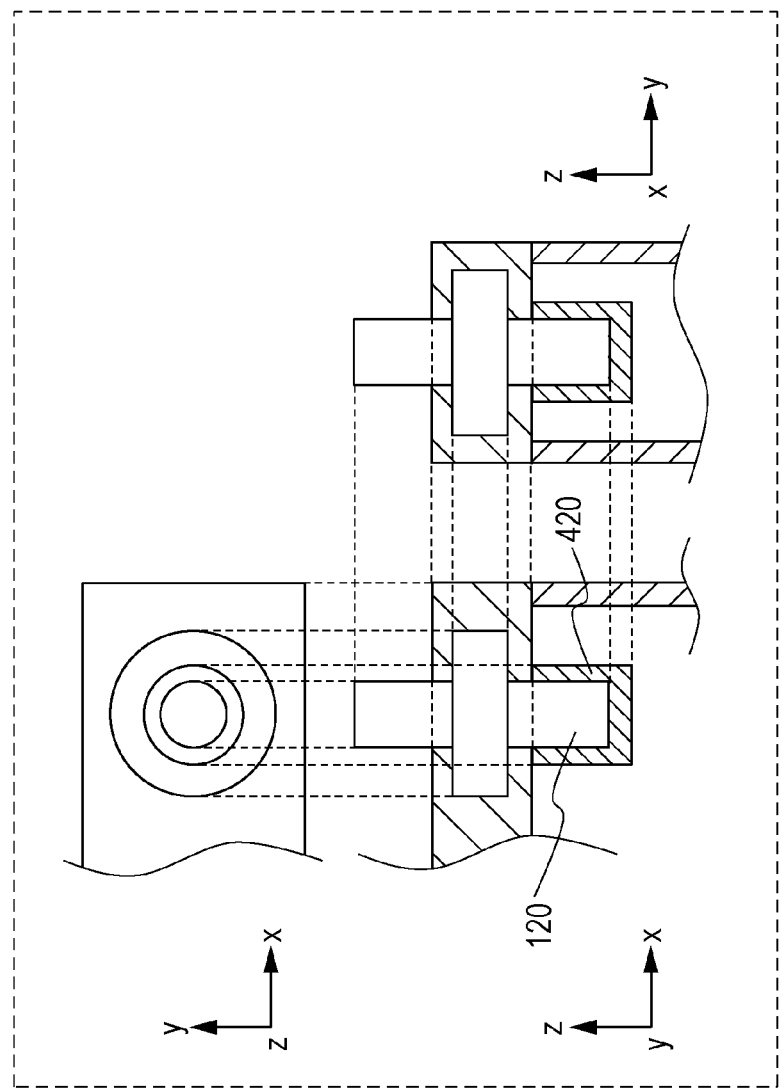
FIG. 15 schematically illustrates a configuration of a housing according to a seventh embodiment.

FIG. 15 schematically illustrates a configuration of a housing according to the seventh embodiment.

In addition to the configuration described in one of the first through third embodiments, the housing according to the seventh embodiment includes the following configuration.

Specifically, the housing according to the seventh embodiment includes a second metal part 420.

The second metal part 420 is in contact with a second end 120 of a terminal 100.

In the configuration described above, a contact resistance occurring when the second end 120 of the terminal 100 contacts an electrode of a power-generation element can be reduced.

Examples of a material constituting the second metal part 420 include stainless steel, copper, nickel, lead, aluminium, and an alloy containing at least one of these metals.

Figure 16:
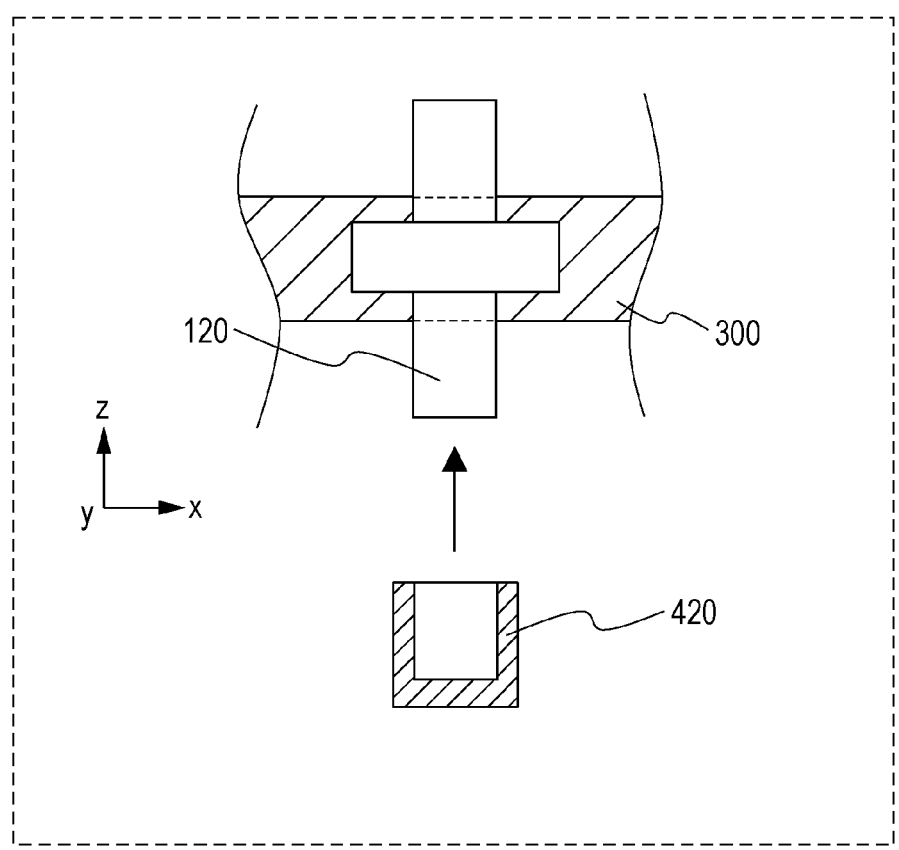
FIG. 16 schematically illustrates a method for fabricating a housing according to the seventh embodiment.

FIG. 16 schematically illustrates a method for fabricating a housing according to the seventh embodiment.

Referring to FIG. 16, an example method for fabricating a housing according to the seventh embodiment will now be described.

First, a terminal 100 and a second metal part 420 are individually prepared. At this time, the second metal part 420 is formed in a cap shape having an opening. Next, a second end 120 of the terminal 100 is inserted in the opening of the second metal part 420. In this manner, the terminal 100 and the second metal part 420 are integrated.

As a method for integrating the terminal 100 and the second metal part 420, a generally known method (e.g., a method of externally pressing for adhesion) can be employed.

The second metal part 420 may be formed, as a metal thin film, on the second end 120 of the terminal 100 by a generally known method (e.g., plating, evaporation, application of conductive paste).

The second metal part 420 is disposed not to be exposed to the outside (a part of the terminal 100 including a first end 110) of an exterior member 300.

Eighth Embodiment

An eighth embodiment will now be described. Part of the eighth embodiment already described in one of the first through seventh embodiments is not described when unnecessary.

Figure 17:
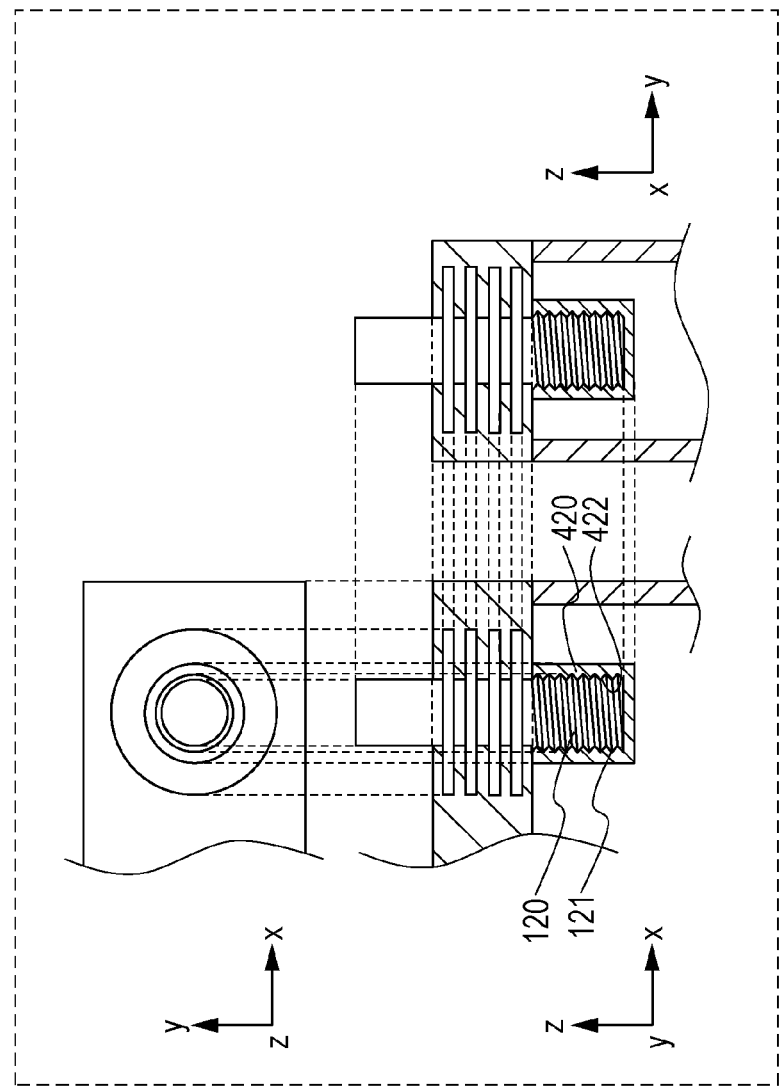
FIG. 17 schematically illustrates a configuration of a housing according to an eighth embodiment.

FIG. 17 schematically illustrates a configuration of a housing according to the eighth embodiment.

In addition to the configuration described in the seventh embodiment, the housing according to the eighth embodiment includes the following configuration.

Specifically, in the eighth embodiment, a second metal part 420 includes s screw hole 422.

A second end 120 of a terminal 100 includes a screw part 121.

The screw part 121 of the second end 120 of the terminal 100 is inserted into the screw hole 422 of the second metal part 420.

In the configuration described above, the second metal part 420 can be easily attached to the second end 120 of the terminal 100. The position of the second metal part 420 can be held with a screw structure including the second end 120 of the terminal 100. That is, the contact relationship (positional relationship) between the second metal part 420 and the second end 120 of the terminal can be more strongly held.

Figure 18:
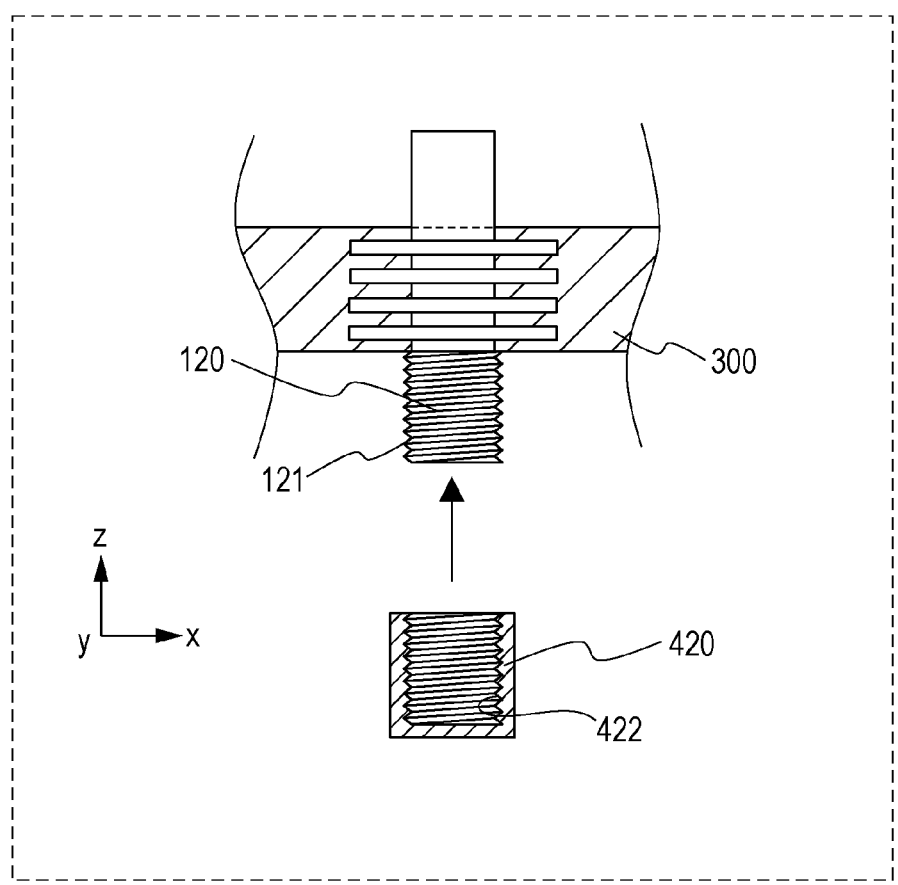
FIG. 18 schematically illustrates a method for fabricating a housing according to the eighth embodiment.

FIG. 18 schematically illustrates a method for fabricating a housing according to the eighth embodiment.

Referring to FIG. 18, an example method for fabricating a housing according to the eighth embodiment will now be described.

First, a terminal 100 and a second metal part 420 are individually prepared. At this time, a screw part 121 is formed in the second end 120 of the terminal 100. A screw hole 422 is formed in the second metal part 420. The screw part 121 of the second end 120 of the terminal 100 is then inserted into the screw hole 422 of the second metal part 420. In this manner, the terminal 100 and the second metal part 420 are integrated.

Ninth Embodiment

A ninth embodiment will now be described. Part of the ninth embodiment already described in one of the first through eighth embodiments is not described when unnecessary.

Figure 19:
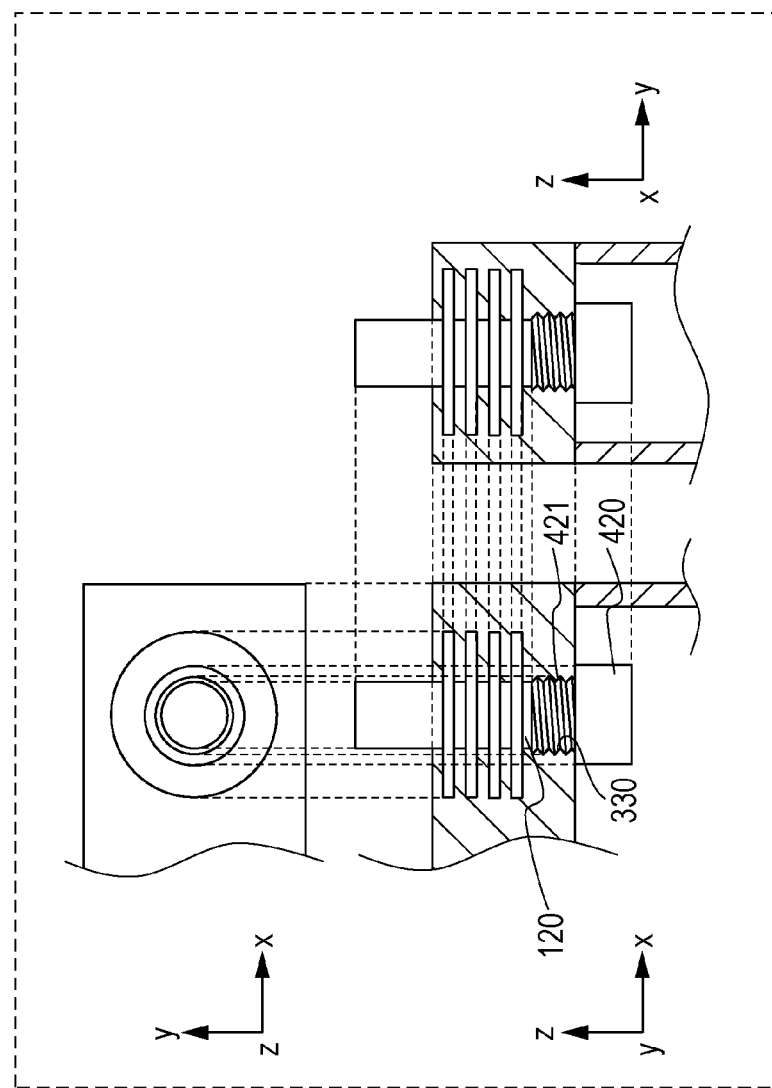
FIG. 19 schematically illustrates a configuration of a housing according to a ninth embodiment.

FIG. 19 schematically illustrates a configuration of a housing according to the ninth embodiment.

In addition to the configuration described in the seventh embodiment, the housing according to the ninth embodiment includes the following configuration.

Specifically, in the ninth embodiment, an exterior member 300 includes an inner screw hole 330 disposed inside the exterior member 300.

A second metal part 420 includes a screw part 421.

The screw part 421 of the second metal par 420 is inserted into the inner screw hole 330.

In the configuration described above, the second metal part 420 can be easily attached to the housing. The position of the second metal part 420 can be held with a screw structure including the exterior member 300. That is, the contact relationship (positional relationship) between the second metal part 420 and a second end 120 of a terminal 100 can be more strongly held by the sturdier exterior member 300.

Figure 20:
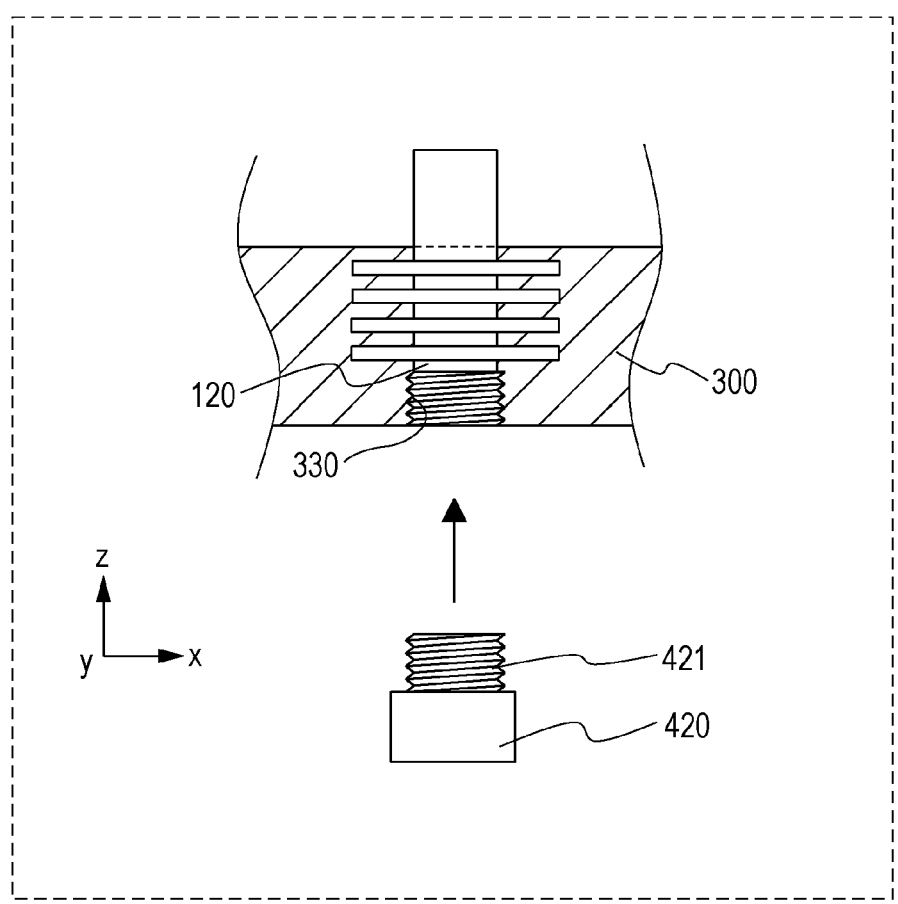
FIG. 20 schematically illustrates a method for fabricating a housing according to the ninth embodiment.

FIG. 20 schematically illustrates a method for fabricating a housing according to the ninth embodiment.

Referring to FIG. 20, an example method for fabricating a housing according to the ninth embodiment will now be described.

First, a terminal 100 and a second metal part 420 are individually prepared. At this time, a screw part 421 is formed in the second metal part 420. The terminal 100 is integrated with the exterior member 300. An inner screw hole 330 is formed in the exterior member 300. The screw part 421 of the second metal part 420 is then inserted into the inner screw hole 330 of the exterior member 300. In this manner, the terminal 100 and the second metal part 420 come into contact with each other.

Figure 21:
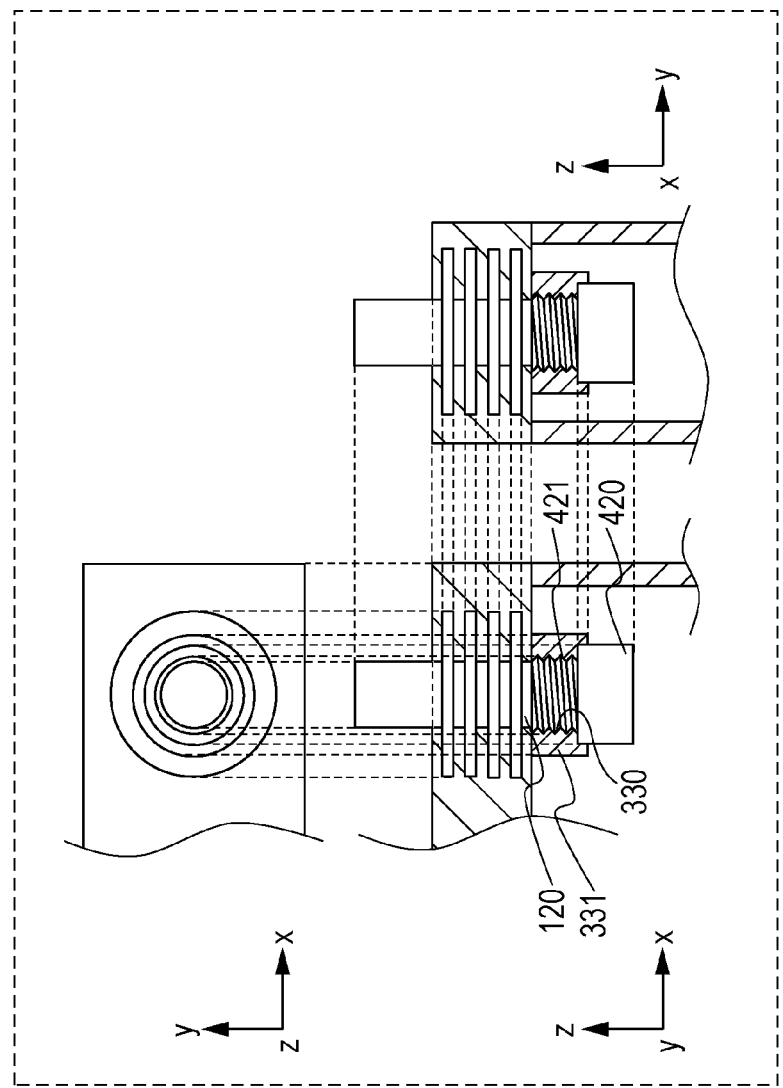
FIG. 21 schematically illustrates a configuration of a housing according to a variation of the ninth embodiment.

FIG. 21 schematically illustrates a configuration of a housing according to a variation of the ninth embodiment.

In the example illustrated in FIG. 21, the exterior member 300 includes an inner projection 331.

The inner projection 331 includes an inner screw hole 330.

In the configuration described above, even in a case where a screw hole cannot be formed in the exterior member 300 due to, for example, a small thickness of the exterior member 300, the inner projection 331 enables the inner screw hole 330 to be disposed.

Figure 22:
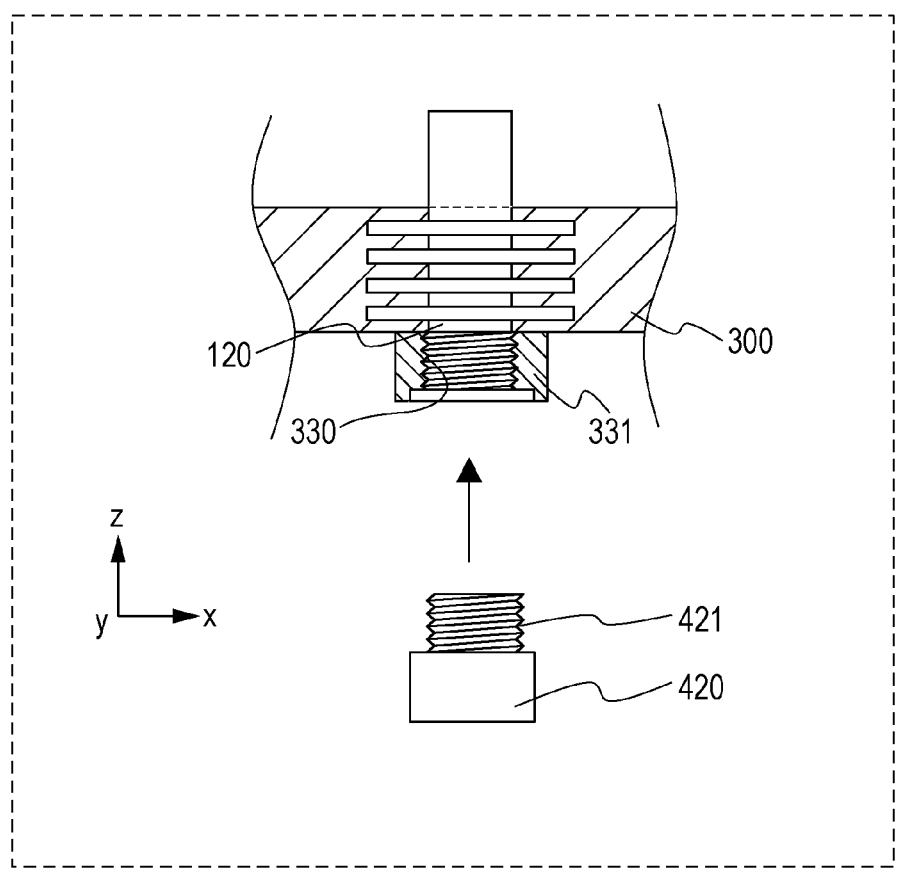
FIG. 22 schematically illustrates a method for fabricating a housing according to a variation of the ninth embodiment.

FIG. 22 schematically illustrates a method for fabricating a housing according to a variation of the ninth embodiment.

Referring to FIG. 22, an example method for fabricating a housing according to the ninth embodiment will now be described.

First, a terminal 100 and a second metal part 420 are individually prepared. At this time, a screw part 421 is formed in the second metal part 420. The terminal 100 is integrated with an exterior member 300. An inner projection 331 including an inner screw hole 330 is provided on the exterior member 300. The screw part 421 of the second metal part 420 is then inserted into the inner screw hole 330 of the inner projection 331 of the exterior member 300. In this manner, the terminal 100 and the second metal part 420 come into contact with each other.

Tenth Embodiment

A tenth embodiment will now be described. Part of the tenth embodiment already described in one of the first through ninth embodiments is not described when unnecessary.

Figure 23:
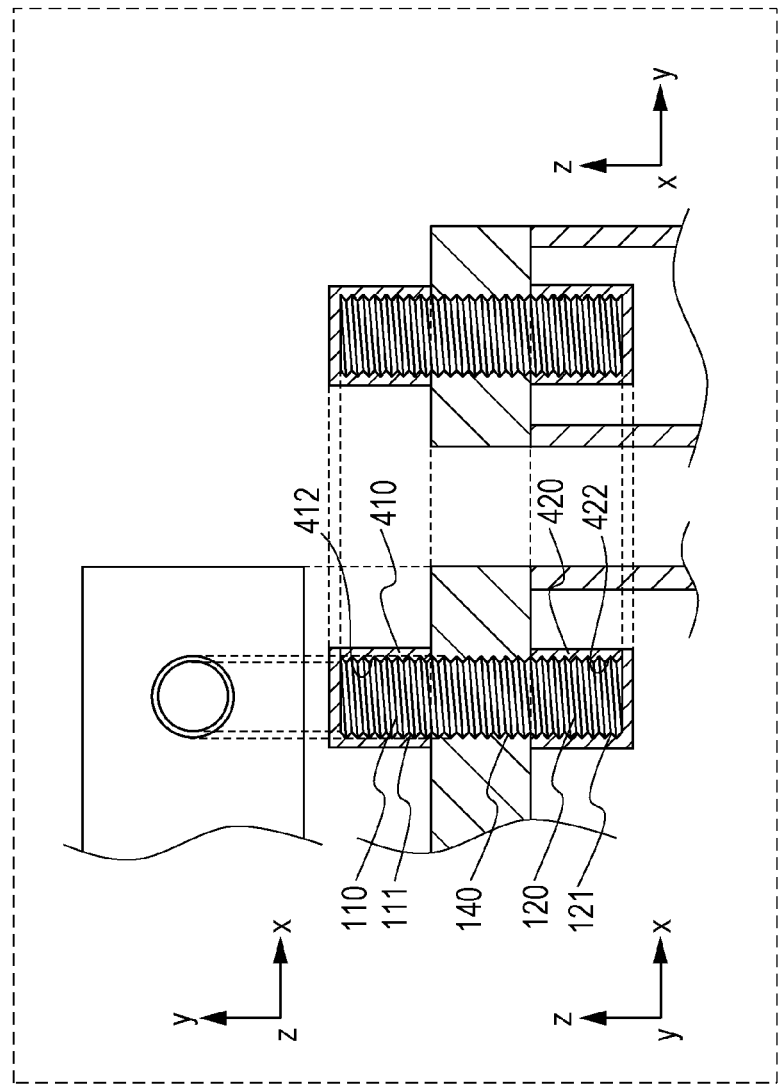
FIG. 23 schematically illustrates a configuration of a housing according to a tenth embodiment.

FIG. 23 schematically illustrates a configuration of a housing according to the tenth embodiment.

In addition to the configuration described in one of the first through third embodiments, the housing according to the tenth embodiment includes the following configuration.

Specifically, the housing according to the tenth embodiment includes a first metal part 410 and a second metal part 420.

The first metal part 410 is in contact with a first end 110 of a terminal 100.

The second metal part 420 is in contact with a second end 120 of the terminal 100.

In the configuration described above, a contact resistance occurring when the first end 110 of the terminal 100 contacts a member (e.g., a wire to external equipment) connected to the terminal 100 can be reduced. In addition, a contact resistance occurring when the second end 120 of the terminal 100 contacts an electrode of a power-generation element can be reduced.

Configurations (including a material, a shape, a fabrication method, an installation method, etc.) of the first metal part 410 can be similar to configurations of the first metal part 410 described in one of the fourth through sixth embodiments.

Configurations (including a material, a shape, a fabrication method, an installation method, etc.) of the second metal part 420 can be similar to configurations of the second metal part 420 described in one of the seventh through ninth embodiments.

In the example illustrated in FIG. 23, a screw-shaped part 140 is formed by a first long-diameter part 131 and a second long-diameter part 132.

A screw-shaped part 140 is embedded in an exterior member 300.

The first metal part 410 includes a screw part 412.

The first end 110 of the terminal 100 includes a screw part 111.

The screw part 111 of the first end 110 of the terminal 100 is inserted into the screw hole 412 of the first metal part 410.

A second metal part 420 includes a screw part 422.

The second end 120 of the terminal 100 includes a screw part 121.

The screw part 121 of the second end 120 of the terminal 100 is inserted into the screw hole 422 of the second metal part 420.

In the configuration described above, the terminal 100, the first metal part 410, and the second metal part 420 can be easily attached to the exterior member 300. For example, the terminal 100 can be disposed on the exterior member 300 by a simple method as described above.

Figure 24:
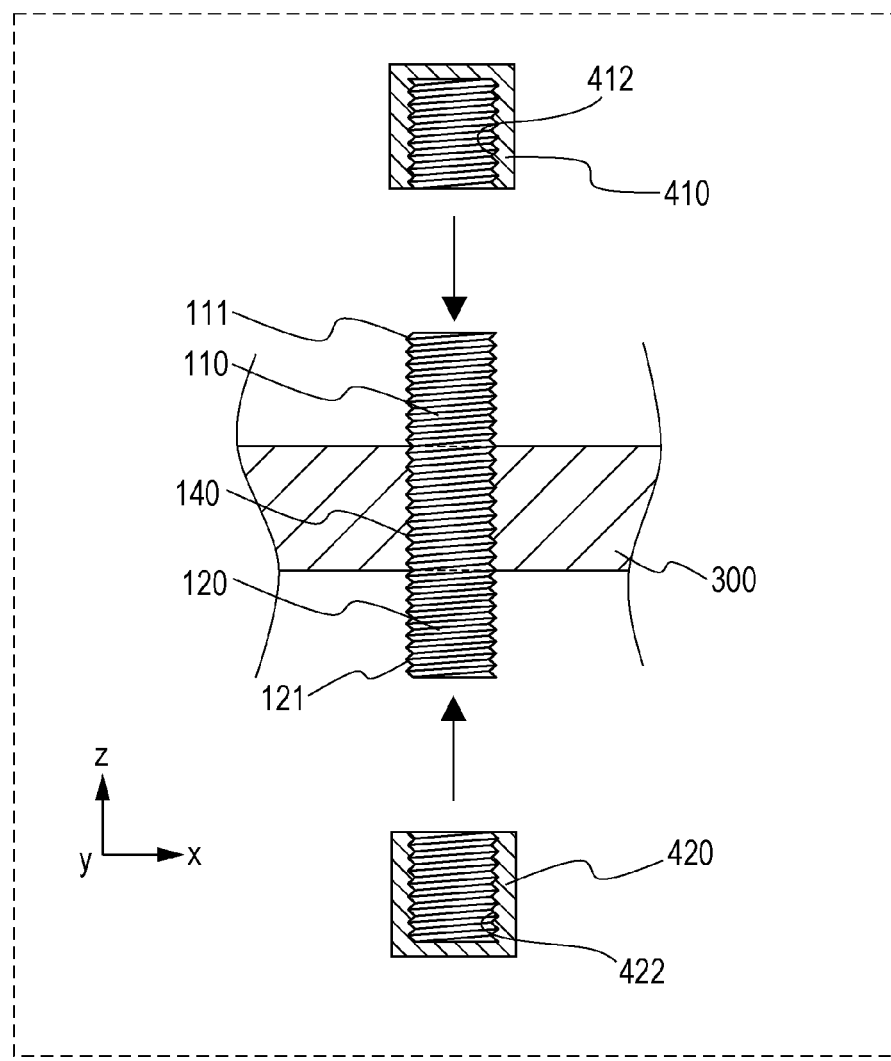
FIG. 24 schematically illustrates a method for fabricating a housing according to the tenth embodiment.

FIG. 24 schematically illustrates a method for fabricating a housing according to the tenth embodiment.

Referring to FIG. 24, an example method for fabricating a housing according to the tenth embodiment will now be described.

First, a terminal 100, a first metal part 410, and a second metal part 420 are individually prepared. Specifically, a screw-shaped part 140, a screw part 111, and a screw part 121 are formed in the terminal 100. A screw hole 412 is formed in the first metal part 410. A screw hole 422 is formed in the second metal part 420.

Then, an exterior member 300 is shaped so that the screw-shaped part 140 of the terminal 100 is embedded in the exterior member 300. In this manner, the exterior member 300 and the terminal 100 are integrated.

The screw part 111 of the first end 110 of the terminal 100 is inserted into the screw hole 412 of the first metal part 410. In this manner, the terminal 100 and the first metal part 410 are integrated.

The screw part 121 of the second end 120 of the terminal 100 is inserted into the screw hole 422 of the second metal part 420. In this manner, the terminal 100 and the second metal part 420 are integrated.

Eleventh Embodiment

An eleventh embodiment will now be described. Part of the eleventh embodiment already described in one of the first through tenth embodiments is not described when unnecessary.

FIG. 25 schematically illustrates a configuration of a power storage device according to the eleventh embodiment.

The power storage device according to the eleventh embodiment includes a housing 1000 and a power-generation element 2000.

The housing 1000 is one of the housings (e.g., battery housings) described in the first through tenth embodiments.

The power-generation element 2000 includes an electrode.

The power-generation element 2000 is housed inside an exterior member 300.

A second end of a terminal of the housing 1000 is electrically connected to an electrode of the power-generation element 2000.

In the configuration described above, a power storage device including a terminal having high resistance to corrosion and suppressing entering of water and other substances can be obtained. That is, a power storage device that can suppress degradation of performance of the power-generation element 2000 housed in the exterior member 300 of the housing 1000 can be obtained.

The power-generation element 2000 may be, for example, a battery or a capacitor.

The power-generation element 2000 may use, as a guest material, metal ions having a potential lower than a hydrogen generation potential. The power-generation element 2000 may include a metal having a potential lower than a hydrogen generation potential (e.g., lithium, sodium, or magnesium) for a positive electrode active material, a negative electrode active material, or an electrolyte.

The power storage device may be, for example, a secondary battery.

An example method for fabricating a power storage device according to the eleventh embodiment will now be described.

First, a lid 301, a side wall 302, and a bottom 303 of a housing 1000 are prepared. At this time, a terminal is disposed on the lid 301 of the housing 1000. The side wall 302 and the bottom 303 of the housing 1000 are integrated. Then, a power-generation element 2000 is housed in space formed by integrating the side wall 302 and the bottom 303. At this time, an electrode of the power-generation element 2000 and a second end of the terminal are connected to each other. Thereafter, the lid 301 and the side wall 302 are integrated.

In the foregoing manner, the housing 1000 can house the power-generation element 2000 in, for example, a hermetically sealed state.

As a method for integrating the lid 301, the side wall 302, and the bottom 303, a generally known method (e.g., crimping or welding) can be employed.

In the example illustrated in FIG. 25, the power-generation element 2000 includes a positive electrode 2100 and a negative electrode 2200.

A second end 120 of a terminal 100 is electrically connected to the positive electrode 2100 of the power-generation element 2000.

A second end 220 of a second terminal 200 is electrically connected to the negative electrode 2200 of the power-generation element 2000.

In the configuration described above, a power storage device including two terminals (i.e., a positive-electrode terminal and a negative-electrode terminal) having high resistance to corrosion and suppressing entering of water and other substances can be obtained. That is, a power storage device that can more firmly suppress degradation of performance of the power-generation element 2000 housed inside the exterior member 300 of the housing 1000 can be obtained.

The power storage device according to the eleventh embodiment may include a plurality of power-generation elements.

In this case, the power-generation elements may be connected to one another in series or in parallel to constitute a power-generation module.

In this case, the power-generation module is housed in the housing 1000.

At this time, the second end 120 of the terminal 100 may be connected to one of electrodes of the power-generation module with the second end 220 of the second terminal 200 being connected to the other electrode.

The power-generation modules may be connected in series or in parallel to constitute a power-generation pack.

In this case, the power-generation pack is housed in the housing 1000.

At this time, the second end 120 of the terminal 100 may be connected to one of electrodes of the power-generation pack with the second end 220 of the second terminal 200 being connected to the other electrode.

An electrode of a power-generation element (or a power-generation module or a power-generation pack) may be directly connected to (in contact with) the second end 120 of the terminal 100 (or the second end 220 of the second terminal 200).

An electrode of a power-generation element (or a power-generation module or a power-generation pack) may be directly connected to the second end 120 of the terminal 100 (or the second end 220 of the second terminal 200) through a lead wire, for example.

In a case where the housing 1000 includes the second metal part 420 described in one of the seventh through tenth embodiments, an electrode of a power-generation element (or a power-generation module or a power-generation pack) may be directly connected to the second end 120 of the terminal 100 (or the second end 220 of the second terminal 200) through the second metal part 420.

An electrode of a power-generation element (or a power-generation module or a power-generation pack) may be directly connected to (or in contact with) the second metal part 420.

A first end 210 of the second terminal 200 may include a first metal part 410, in a manner similar to the terminal 100.

The second end 220 of the second terminal 200 may include a second metal part 420, in a manner similar to the terminal 100.

An electrode of a power-generation element (or a power-generation module or a power-generation pack) may be connected to the second metal part 420 of the second end 120 of the terminal 100. In this case, the other electrode of the power-generation element (or the power-generation module or the power-generation pack) may be connected to the second metal part 420 of the second end 220 of the second terminal 200.

The housing according to the first through tenth embodiments may be a housing of a power storage device (e.g., battery) or other devices.

The configurations according to the first through eleventh embodiments may be appropriately combined.

A housing according to the present disclosure is usable as a container of a power storage device or other devices.

What is claimed is:

1. A battery housing comprising:
   an exterior member;
   a first terminal of a non-metallic material; and
   a first metal part, wherein:
   the first terminal has a first end extending to outside of the exterior member,
   the first terminal has a second end extending to inside of the exterior member,
   the first terminal includes a first long-diameter part having a first long diameter and a second long-diameter part having a second long diameter larger than the first long diameter, the first long-diameter part and the second long-diameter part being disposed between the first end of the first terminal and the second end of the first terminal,
   the first long-diameter part and the second long-diameter part are embedded in the exterior member,
   the first metal part is in contact with the first end of the first long-diameter part,
   the first metal part includes a screw hole,
   the first end of the first terminal includes a screw part, and
   the screw part of the first end of the first terminal is inserted in the screw hole of the first metal part.

2. The battery housing according to claim 1, wherein
   the first terminal includes a third long-diameter part having a third long diameter larger than the first long diameter and disposed between the first end of the first terminal and the second end of the first terminal, and
   the third long-diameter part is embedded in the exterior member.

3. The battery housing according to claim 1, wherein
   the first long-diameter part and the second long-diameter part form a screw-shaped part, and
   the screw-shaped part is embedded in the exterior member.

4. The battery housing according to claim 3, wherein
   the screw-shaped part has a short diameter larger than at least one of a long diameter of the first end of the first terminal or a long diameter of the second end of the first terminal.

5. The battery housing according to claim 1, further comprising
   a second terminal of a non-metallic material, wherein
   the second terminal has a first end extending to outside of the exterior member,
   the second terminal has a second end extending to inside of the exterior member,
   the second terminal includes a first long-diameter part having a first long diameter and a second long-diameter part having a second long diameter larger than the first long diameter, the first long-diameter part and the second long-diameter part being disposed between the first end of the second terminal and the second end of the second terminal, and
   the first long-diameter part of the second terminal and the second long-diameter part of the second terminal are embedded in the exterior member.

6. A power storage device comprising:
   the battery housing according to claim 1; and
   a power-generation element including an electrode, wherein
   the power-generation element is housed inside the exterior member, and
   the second end of the first terminal is electrically connected to an electrode of the power-generation element.

7. A power storage device comprising:
   the battery housing according to claim 5; and
   a power-generation element including a positive electrode and a negative electrode, wherein
   the power-generation element is housed inside the exterior member,
   the second end of the first terminal is electrically connected to the positive electrode of the power-generation element, and the second end of the second terminal is electrically connected to the negative electrode of the power-generation element.

8. A battery housing comprising:
an exterior member;
a first terminal of a non-metallic material; and
a first metal part, wherein:
the first terminal has a first end extending to outside of the exterior member,
the first terminal has a second end extending to inside of the exterior member,
the first terminal includes a first long-diameter part having a first long diameter and a second long-diameter part having a second long diameter larger than the first long diameter, the first long-diameter part and the second long-diameter part being disposed between the first end of the first terminal and the second end of the first terminal,
the first long-diameter part and the second long-diameter part are embedded in the exterior member,
the first metal part is in contact with the first end of the first long-diameter part,
the exterior member includes an outer screw hole disposed outside the exterior member,
the first metal part includes a screw part, and
the screw part of the first metal part is inserted into the outer screw hole.

9. The battery housing according to claim 8, wherein:
the first terminal includes a third long-diameter part having a third long diameter larger than the first long diameter and disposed between the first end of the first terminal and the second end of the first terminal, and
the third long-diameter part is embedded in the exterior member.

10. The battery housing according to claim 8, wherein:
the first long-diameter part and the second long-diameter part form a screw-shaped part, and
the screw-shaped part is embedded in the exterior member.

11. The battery housing according to claim 10, wherein:
the screw-shaped part has a short diameter larger than at least one of a long diameter of the first end of the first terminal or a long diameter of the second end of the first terminal.

12. The battery housing according to claim 8, further comprising
a second terminal of a non-metallic material, wherein
the second terminal has a first end extending to outside of the exterior member,
the second terminal has a second end extending to inside of the exterior member,
the second terminal includes a first long-diameter part having a first long diameter and a second long-diameter part having a second long diameter larger than the first long diameter, the first long-diameter part and the second long-diameter part being disposed between the first end of the second terminal and the second end of the second terminal, and
the first long-diameter part of the second terminal and the second long-diameter part of the second terminal are embedded in the exterior member.

13. A power storage device comprising:
the battery housing according to claim 8; and
a power-generation element including an electrode, wherein
the power-generation element is housed inside the exterior member, and
the second end of the first terminal is electrically connected to an electrode of the power-generation element.

14. A power storage device comprising:
the battery housing according to claim 12; and
a power-generation element including a positive electrode and a negative electrode, wherein
the power-generation element is housed inside the exterior member,
the second end of the first terminal is electrically connected to the positive electrode of the power-generation element, and
the second end of the second terminal is electrically connected to the negative electrode of the power-generation element.

15. A battery housing comprising:
an exterior member;
a first terminal of a non-metallic material; and
a second metal part, wherein:
the first terminal has a first end extending to outside of the exterior member,
the first terminal has a second end extending to inside of the exterior member,
the first terminal includes a first long-diameter part having a first long diameter and a second long-diameter part having a second long diameter larger than the first long diameter, the first long-diameter part and the second long-diameter part being disposed between the first end of the first terminal and the second end of the first terminal,
the first long-diameter part and the second long-diameter part are embedded in the exterior member,
the second metal part is in contact with the second end of the first terminal,
the second metal part includes a screw hole,
the second end of the first terminal includes a screw part, and
the screw part of the second end of the first terminal is inserted into the screw hole of the second metal part.

16. The battery housing according to claim 15, wherein:
the first terminal includes a third long-diameter part having a third long diameter larger than the first long diameter and disposed between the first end of the first terminal and the second end of the first terminal, and
the third long-diameter part is embedded in the exterior member.

17. The battery housing according to claim 15, wherein
the first long-diameter part and the second long-diameter part form a screw-shaped part, and
the screw-shaped part is embedded in the exterior member.

18. The battery housing according to claim 17, wherein
the screw-shaped part has a short diameter larger than at least one of a long diameter of the first end of the first terminal or a long diameter of the second end of the first terminal.

19. The battery housing according to claim 15, further comprising
a second terminal of a non-metallic material, wherein:
the second terminal has a first end extending to outside of the exterior member,
the second terminal has a second end extending to inside of the exterior member,
the second terminal includes a first long-diameter part having a first long diameter and a second long-diameter part having a second long diameter larger than the first long diameter, the first long-diameter part and the second long-diameter part being disposed between the first end of the second terminal and the second end of the second terminal, and the first long-diameter part of the second terminal and the second long-diameter part of the second terminal are embedded in the exterior member.

20. A power storage device comprising:
the battery housing according to claim 15; and
a power-generation element including an electrode, wherein:
the power-generation element is housed inside the exterior member, and
the second end of the first terminal is electrically connected to an electrode of the power-generation element.

21. A power storage device comprising:
the battery housing according to claim 19; and
a power-generation element including a positive electrode and a negative electrode, wherein:
the power-generation element is housed inside the exterior member,
the second end of the first terminal is electrically connected to the positive electrode of the power-generation element, and
the second end of the second terminal is electrically connected to the negative electrode of the power-generation element.

22. A battery housing comprising:
an exterior member;
a first terminal of a non-metallic material; and
a second metal part, wherein:
the first terminal has a first end extending to outside of the exterior member,
the first terminal has a second end extending to inside of the exterior member,
the first terminal includes a first long-diameter part having a first long diameter and a second long-diameter part having a second long diameter larger than the first long diameter, the first long-diameter part and the second long-diameter part being disposed between the first end of the first terminal and the second end of the first terminal,
the first long-diameter part and the second long-diameter part are embedded in the exterior member,
the second metal part is in contact with the second end of the first terminal,
the exterior member includes an inner screw hole disposed inside the exterior member,
the second metal part includes a screw hole, and
the screw part of the second metal part is inserted into the inner screw hole.

23. The battery housing according to claim 22, wherein:
the first terminal includes a third long-diameter part having a third long diameter larger than the first long diameter and disposed between the first end of the first terminal and the second end of the first terminal, and
the third long-diameter part is embedded in the exterior member.

24. The battery housing according to claim 22, wherein:
the first long-diameter part and the second long-diameter part form a screw-shaped part, and
the screw-shaped part is embedded in the exterior member.

25. The battery housing according to claim 24, wherein:
the screw-shaped part has a short diameter larger than at least one of a long diameter of the first end of the first terminal or a long diameter of the second end of the first terminal.

26. The battery housing according to claim 22, further comprising
a second terminal of a non-metallic material, wherein:
the second terminal has a first end extending to outside of the exterior member,
the second terminal has a second end extending to inside of the exterior member,
the second terminal includes a first long-diameter part having a first long diameter and a second long-diameter part having a second long diameter larger than the first long diameter, the first long-diameter part and the second long-diameter part being disposed between the first end of the second terminal and the second end of the second terminal, and
the first long-diameter part of the second terminal and the second long-diameter part of the second terminal are embedded in the exterior member.

27. A power storage device comprising:
the battery housing according to claim 22; and
a power-generation element including an electrode, wherein:
the power-generation element is housed inside the exterior member, and
the second end of the first terminal is electrically connected to an electrode of the power-generation element.

28. A power storage device comprising:
the battery housing according to claim 26; and
a power-generation element including a positive electrode and a negative electrode, wherein:
the power-generation element is housed inside the exterior member,
the second end of the first terminal is electrically connected to the positive electrode of the power-generation element, and
the second end of the second terminal is electrically connected to the negative electrode of the power-generation element.

* * * * *